United States Patent [19]

Herzog

[11] Patent Number: 5,081,648

[45] Date of Patent: Jan. 14, 1992

[54] CURRENT MODE DATA BUS DIGITAL COMMUNICATIONS SYSTEM

[75] Inventor: Hans K. Herzog, Bellevue, Wash.

[73] Assignee: The Boeing Company, Seattle, Wash.

[21] Appl. No.: 491,555

[22] Filed: Mar. 12, 1990

[51] Int. Cl.[5] .............................................. H04B 3/02
[52] U.S. Cl. ................................. 375/36; 178/69 C; 333/119
[58] Field of Search ...................... 375/36; 370/85, 24, 370/25, 32; 333/117, 119, 100; 307/17; 336/196; 178/69 C

[56] References Cited

U.S. PATENT DOCUMENTS

| | | | |
|---|---|---|---|
| 795,402 | 7/1905 | Lodge | 178/45 |
| 1,210,884 | 1/1917 | Baldwin | 370/5 |
| 1,288,709 | 12/1918 | Shaw | 333/5 |
| 1,515,643 | 11/1924 | Wright | 379/345 |
| 2,001,847 | 5/1935 | Lockrow | 333/12 |
| 2,036,045 | 3/1936 | Harris | 174/34 |
| 2,037,846 | 4/1936 | Aikens | 333/12 |
| 2,085,434 | 6/1937 | Loftis et al. | 343/852 |
| 2,272,613 | 2/1942 | Phelps | 333/119 |
| 3,071,737 | 1/1963 | Lam | 333/8 |
| 3,108,157 | 10/1963 | Feiner | 379/202 |
| 4,038,601 | 7/1977 | Laborie et al. | 370/32 X |
| 4,264,827 | 4/1981 | Herzog | 307/17 |
| 4,456,986 | 6/1984 | Carsten et al. | 370/30 |
| 4,467,293 | 8/1984 | Apel | 333/112 |
| 4,707,673 | 11/1987 | Lee et al. | 333/112 |
| 4,714,802 | 12/1987 | Stein | 178/1 |
| 4,723,120 | 2/1988 | Petty, Jr. | 340/825.02 |
| 4,764,922 | 8/1988 | Dieter et al. | 370/123 |
| 4,823,364 | 4/1989 | Herzog | 375/36 |
| 4,825,450 | 4/1989 | Herzog | 375/17 |

FOREIGN PATENT DOCUMENTS

WO85/02474 6/1985 PCT Int'l Appl.

Primary Examiner—Benedict V. Safourek
Assistant Examiner—Tesfaldet Bocure
Attorney, Agent, or Firm—Christensen, O'Connor, Johnson & Kindness

[57] ABSTRACT

A current mode data communication system is disclosed in which the system data bus is formed by an unshielded twisted wire pair (12). Coupled to the data bus by bus couplers (16) and bus-to-stub couplers (80) are current mode data stubs (82), which also are formed by pairs of twisted, unshielded wires (84 and 86). One or more interface-to-stub couplers (88) are inductively coupled to each curretn mode data stub and, in addition, are connected in signal communication with one of the system utilization devices (10). Data signals propagating along the system data bus (12) are coupled to each utilization device (10) via an associated bus coupler (16), bus-to-stub coupler (80), and interface-to-stub coupler (88) without reflecting the signal into the system data bus (12). Signals are supplied to the system data bus (12) by each utilization device (10) via an associated interface-to-stub coupler (88), current mode data stub (82), bus-to-stub couple (80) and bus coupler (16) without direct coupling of the signal to either the receive channel of the utilization device (10) that is transmitting signals to the system data bus (12) or the receive channels of other utilizaiton devices (10) that utilize the same current mode data stub.

22 Claims, 8 Drawing Sheets

CURRENT MODE DATA BUS DIGITAL COMMUNICATIONS SYSTEM

FIELD OF THE INVENTION

This invention relates to systems in which a plurality of devices are coupled to and communicate with one another via a current mode digital data communication bus. More particularly, this invention relates to arrangements for interconnecting such devices to a common data bus. Although useful in various environments, the invention is particularly suited for use in aircraft data communication systems in which: system and component size and weight are of great concern; devices being coupled to the data bus may be located a substantial distance from the data bus; it may be necessary or desirable to couple a number of devices to a relatively short length of the data bus (i.e., "cluster" a plurality of devices); and the system design requirements impose stringent constraints relative to susceptibility to electromagnetic interference, system signal to noise ratio, and power consumption.

BACKGROUND OF THE INVENTION

There are numerous prior art arrangements in which a common data bus is used to establish signal communication between separate systems, system components or subsystems. In such arrangements, each system, subsystem or system component ("utilization device") is connected to the common data bus thus allowing the utilization devices to communicate with one another and/or share common resources such as a memory or a signal source without separately connecting the utilization devices to one another or separately connecting the utilization devices to a commonly employed signal source or memory. Thus, the use of a common data bus can greatly simplify system topology, often resulting in increased reliability and reduced costs of installation and repair. Since time division multiplexing of the data bus signals can be employed, such arrangements also are capable of providing relatively high speed signal communication between a relatively large number of utilization devices.

The ability to interconnect numerous utilization devices with a common data bus (e.g., a single pair of wires) instead of numerous individual wires is of special significance relative to the avionics and electronics systems of modern aircraft. Specifically, using one or more common data buses to interconnect various aircraft avionics and electronics systems and/or to interconnect the subsystems and components of a single aircraft avionic or electronic system can provide a substantial reduction in the space required for the routing of wires and the weight of the necessary wires. Further, using one or more common data buses allows traditionally separate systems that utilize independently derived, identical signal information to be integrated with one another to the extent that signal information generated by one of the utilization devices can be transmitted to other utilization devices via the common data bus thereby eliminating the need for independent derivation or replication of that signal information. Such integration permits simplification of various utilization devices, with further attendant reduction in aircraft weight and further reduction in the space required for aircraft electronic and avionic systems.

Various common data bus data communications have been proposed for use onboard aircraft. For example, U.S. Pat. Nos. 4,199,663 and 4,471,481, both entitled "Autonomous Terminal Data Communication System" and assigned to the assignee of the present application, disclose data bus communication systems specifically arranged for the integration of various aircraft electronic and avionic systems and the achievement of significant reduction in the amount of wiring required to interconnect the various utilization devices of the data communication system. Moreover, these prior art references disclose a system communication protocol which provides reliable and efficient data communication in an aircraft environment.

U.S. Pat. No. 4,264,827 entitled "Current Mode Data or Power Bus," also assigned to the assignee of the present application, discloses autonomous terminal data communication systems that utilize a current mode data bus and are well suited for airborne application. In the arrangement of U.S. Pat. No. 4,264,827 a pair of twisted wires forms the current mode data bus. Coupling transformers having ferrite cores that can be disassembled so that the two conductors of the twisted pair data bus can be inserted between the legs of the disassembled cores provide the inductive coupling of signals to and from the data bus. Specifically, in this arrangement, the data bus wires form secondary transformer windings with the primary windings being permanently installed on the ferrite cores and being connected to data transmitter and/or receiver circuits of a utilization device. One important result of this arrangement is the establishment of signal coupling without the need to cut the conductors of the current mode data bus or having to remove or perforate insulation of those conductors.

U.S. Pat. Nos. 4,823,364 and 4,825,450, respectively entitled "Receive Coupler for Binary Data Communication System" and "Binary Data Communication System" (each of which is assigned to the assignee of the present application), disclose specific signal modulation techniques and arrangements for coupling signals to and from a data bus that is formed by a pair of twisted wires. In the arrangements disclosed by these two references, signals are coupled to and from a current mode data bus by a transmit coupler and a receive coupler, each of which is inductively coupled to the data bus by means of a transformer. Each transmit coupler includes circuits identified as a stub driver and a line driver, which are connected to one another by a shielded twisted pair of wires. The stub driver receives signals from an associated utilization device and converts or conditions the signals for voltage mode transmission along the shielded twisted wire pair. The line driver amplifies the signals provided by the stub driver (via the shielded twisted wire pair) and applies the amplified signal to the data bus via a transmit coupler transformer. The disclosed receive couplers are of similar topology, including a receive coupler transformer; a bus receive amplifier; a shielded twisted pair of wires and a stub receiver. Signals propagating along the data bus bus are coupled to the bus receive amplifier via the receive coupler transformer. The signals provided by the bus receive amplifier are coupled to the shielded twisted wire pair for voltage mode transmission to the stub receiver. The stub receiver provides the necessary signal conversion or conditioning and supplies the conditioned signals to an associated utilization device.

Although the prior art digital communication systems such as those disclosed in the above-referenced United States patents are suitable for use in aircraft and, have at least partially eliminated previous problems, a need for additional improvement exists. For example, the two shielded pairs of twisted wires included in receive and transmit couplers of the type disclosed in U.S. Pat. Nos. 4,823,364 and 4,825,450 result in several system limitations. First, because of signal attenuation and other factors, the length of the shielded twisted pair utilized in the transmit and receive couplers is limited to approximately 30 meters (about 100 feet). In some airborne data bus applications, it is desirable or necessary to connect a data bus to utilization devices that are located more than 30 meters from the data bus. The significant signal attenuation of the shielded twisted pairs can also impose stringent signal conditioning requirements, both with respect to the receive coupler stub receiver amplifier and with respect to the transmit coupler line driver. Moreover, since the shielded wires exhibit a relatively low characteristic impedance, relatively high signal currents are required. Thus, the power level of the transmit channel stub driver and the receive channel receiver amplifier often is higher than desired and circuit efficiency is less than optimal.

Because prior art aircraft data communication systems of the above-described type employ an individual transmit coupler and/or receive coupler for each system utilization device and because a relatively large number of utilization devices can be located within a confined region of the aircraft, it sometimes is necessary to "cluster" numerous couplers along a relatively short length of the data bus. Such clustering can result in signal reflections that decrease the system signal to noise ratio. Even in situations in which this reflection noise does not substantially degrade system performance, the requirement that each utilization device employ a separate receive and/or transmit coupler can result in system topology that is more complex than desired.

As is known in the art, to minimize system complexity and weight, prior art aircraft data communication systems typically supply operating current to the coupler circuitry via the same wires that carry the transmit and receive signals to and from the data bus. For example, in the data communication system disclosed in U.S. Pat. No. 4,825,450, the operating current for the line driver and receive amplifier, which are located proximate the data bus, is supplied via the conductors of the two individually shielded pairs of wires that carry the transmit and receive signals. In this arrangement, resistors are utilized to decouple the power supplies from the data communication signals. This power supply/decoupling arrangement is at least somewhat undesirable because it results in a relatively low common mode rejection voltage range which can have deleterious effect on system susceptibility to electromagnetic interference. Moreover, any imbalance in the receive and transmit coupler arrangements can result in conversion of common mode electromagnetic interference signals into differential interference signals that are amplified by the receive amplifier and thereby degrade system performance.

SUMMARY OF THE INVENTION

In accordance with this invention, digital signal communication is provided between utilization devices via a system current mode data bus that is linked to the utilization devices by means of duplex digital data communications channels. In the disclosed embodiments of the invention, the duplex digital data communication channels that couple signals between the system data bus and system utilization devices are referred to as "transmit-receive stubs" and are unshielded twisted wire pairs that preferably are identical to a twisted wire pair that forms the system data bus.

To establish signal communication between the system data bus and each transmit-receive stub, the invention employs a bus coupler of the type known to the prior art that functions in conjunction with a stub coupler. Located in each stub coupler is a stub transmit transformer and a receive transformer. The stub transmit transformer receives data signals from the bus coupler and supplies corresponding signals to the associated transmit-receive stub. The stub receive transformer receives data signals from the transmit-receive stub and supplies corresponding data signals to the associated bus coupler. Also included in each stub coupler is a cancellation loop that is inductively coupled to the transmit-receive stub by both the stub transmit transformer and the stub receive transformer. The cancellation loop, stub transmit transformer and stub receive transformer are collectively configured and arranged so that the transmit transformer induces currents of equal magnitude in both the transmit-receive stub and the cancellation loop so that the stub receive transformer in effect subtracts the cancellation loop current from the current induced in the transmit-receive stub by the stub transmit transformer. Thus, the stub receive transformer produces no signal with respect to data signals that are coupled from the system data bus by a bus coupler and induced in the transmit-receive stub by means of the stub transmit transformer. This means that data signals propagating along the system data bus are coupled to the transmit-receive stub without recoupling (reflecting) the data signals back into the system data bus.

A stub coupler of the above-described type also is utilized for coupling data signals between each utilization device and its associated transmit-receive stub. Functioning in the above-described manner, the stub coupler that is associated with the utilization device couples signals that are generated by the utilization device to the transmit-receive stub without coupling the transmitted signal to the utilization device receive channel. Thus, signals induced in the transmit-receive stub by a utilization device propagate along the transmit-receive stub; are decoupled from the transmit-receive stub by the receive transformer of the stub coupler that is interconnected with the bus coupler; and are inductively induced in the system data bus by the bus coupler. On the other hand, signals coupled from the data bus and induced in the transmit-receive stub by the above-discussed arrangement of a bus coupler and its associated stub coupler are coupled from transmit-receive stub and are supplied to the utilization device receive channel by means of the stub receive transformer that is included in the stub coupler associated with the utilization device.

In the currently preferred embodiments of the invention, the stub coupler stub transmit transformers and the stub coupler stub receive transformers bear some resemblance to the bus coupler transformers disclosed in the previously referenced U.S. Pat. No. 4,264,827. In this regard, each of the currently preferred stub transmit and receive transformers includes a ferrite core formed by disengagable core pieces that can be installed to a twisted wire pair so that the conductors of the twisted wire pair extend through apertures in the ferrite core and are electromagnetically coupled to a primary winding. To form the cancellation loop that is utilized in each stub coupler of the invention, a loop of wire extends in "FIGURE 8 fashion" through the apertures of the stub transmit transformer and stub receive transformer. Series resistance is included in the cancellation loop to establish the magnitude of the cancellation loop current equal to the magnitude of the signal current that is induced in the transmit-receive stub when a signal is supplied to the primary winding of the stub transmit transformer. In this regard, in accordance with the invention, each end of a transmit-receive stub is terminated with a resistance that is equal to the characteristic impedance of the transmit-receive stub and the series resistance in each cancellation loop is equal to twice the characteristic impedance.

Use of a twisted wire pair current mode transmit-receive stub rather than the shielded twisted wire pair transmit and receive stubs disclosed in the previously referenced U.S. Pat. Nos. 4,823,364 and 4,825,450 results in significant weight savings. Moreover, because the signal attenuation of unshielded twisted wire pairs is lower than signal attenuation of shielded twisted wire pairs and the impedance of the unshielded twisted wire pairs is higher, the invention substantially increases the maximum distance that a utilization device can be located from the data bus and, further, typically results in a improved system signal to noise ratio. Even further, as compared to prior art arrangements of the type disclosed in the referenced U.S. Pat. Nos. 4,823,364 and 4,825,450, the invention provides increased circuit efficiency (decreased power consumption) and utilizes data signal levels that easily can be produced by circuitry that operates at conventional power supply levels.

In embodiments of the invention in which it is desirable or necessary to supply operating current to the active circuitry of the bus coupler and interconnected subcoupler via the transmit-receive stub, inductors are utilized at each end of the transmit-receive stub, with an inductor being connected in series with each wire of the transmit-receive stub. These inductors isolate the power supplies being utilized and the active circuitry being powered from the relatively high frequency data signals that are induced in the transmit-receive stub. Connected between the pair of inductors that is located at each end of the transmit-receive stub is the series combination of a capacitor and resistor. The resistor establishes the transmit-receive stub termination impedance equal to the characteristic impedance of the transmit-receive stub and the capacitor prevents the operating current from flowing through the termination resistors. This arrangement provides increased common mode rejection voltage range relative to the arrangement utilized for supplying operating current via the separately shielded transmit and receive stubs of the previously mentioned U.S. Pat. No. 4,825,450. Moreover, since both the arrangement for supplying the operating current and the above-described bus coupling arrangement results in a substantially balanced circuit configuration, the conversion of common mode electromagnetic interference signals into differential interference signals that can be amplified by the system is minimized. As a result, systems arranged in accordance with the invention provide signal to noise ratios that are generally higher than those encountered in the prior art.

In situations in which the data communications system includes a number of utilization devices that are closely located to one another, the practice of the invention also offers advantages from the standpoint of simplification of system topology and from the standpoint of maintaining a satisfactory system signal to noise ratio. Specifically, in accordance with the invention, a number of utilization devices can be coupled to a single transmit-receive stub by means of the previously discussed stub couplers. In such an arrangement, the cancellation loops of the stub couplers associated with the utilization devices are interconnected (i.e., a common cancellation loop is utilized) so that each utilization device receives only signals that propagate along the system data bus. That is, there is no direct communication between utilization devices that are coupled to the same transmit-receive stub. This particular transmit-receive stub embodiment eliminates the need for using individual bus couplers and associate stub couplers with each of the utilization devices, thereby coupling the utilization devices to the system data bus without installing a number of bus couplers along a short length of the data bus. Eliminating the need for numerous closely spaced bus couplers often results in improved data bus signal to noise ratio in that otherwise insubstantial signal reflection from the bus couplers that is caused by leakage inductance can build to an undesirable level when a number of bus couplers are closely spaced along the system data bus and therefore generate simultaneous, additive reflection noise.

BRIEF DESCRIPTION OF THE DRAWING

These and other aspects and advantages of the invention will be more fully understood by reference to the following detailed description when taken in conjunction with the accompanying drawing in which.

DETAILED DESCRIPTION

Figure 1:
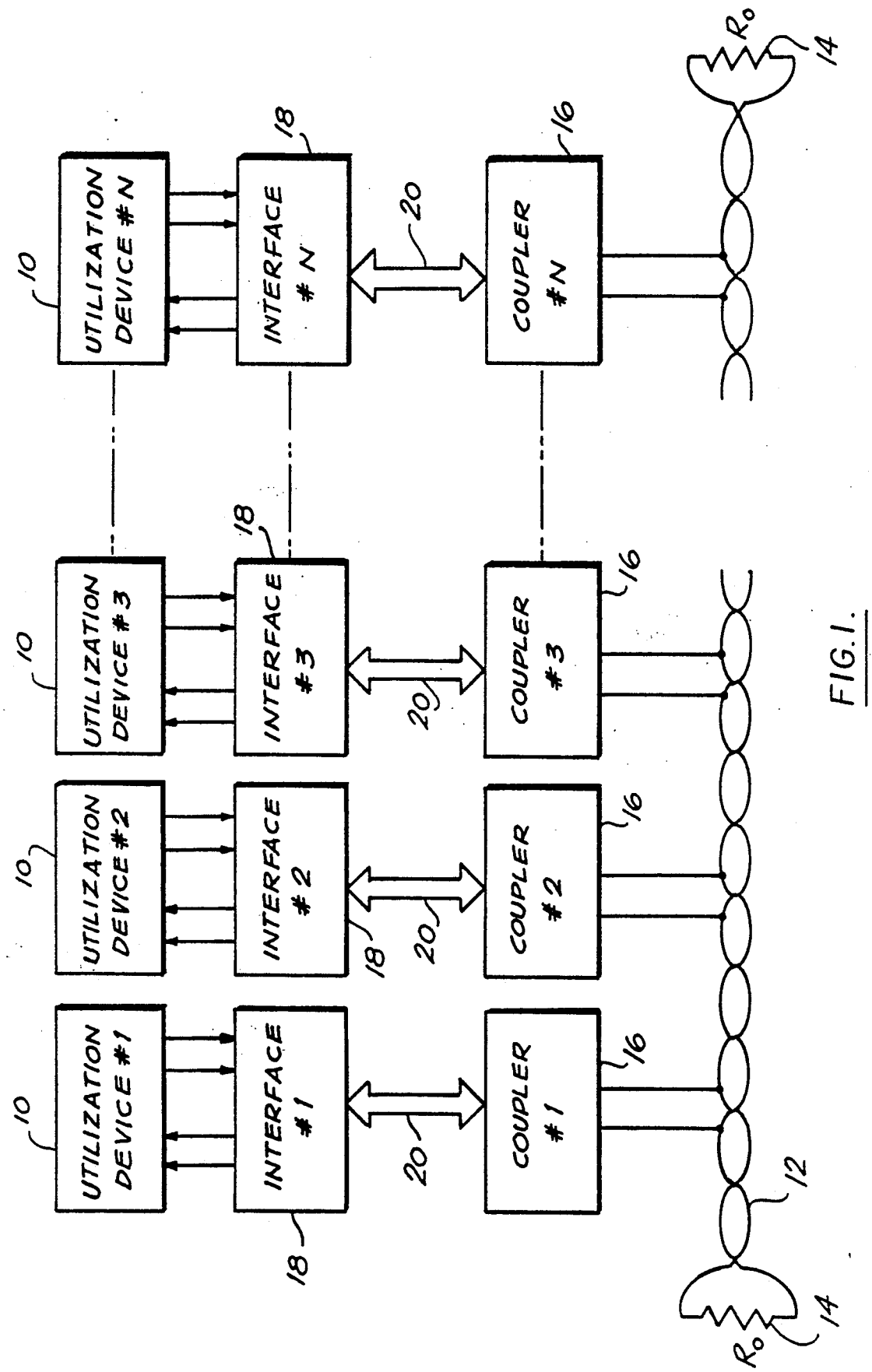
FIG. 1 is a block diagram that illustrates both the basic arrangement of the invention and prior art data communication systems.

FIG. 1 is a block diagram that generally illustrates both the invention and prior art data communication systems of the type that employ a current mode data bus. In FIG. 1, communication between a plurality of utilization devices 10 is provided by a current mode data bus 12. As is known in the art, each utilization device 10 may be either a component or subsystem of a system that includes two or more of the utilization devices 10. Alternatively, each utilization device 10 can be a complete system. In any case, utilization device 10 either receives data signals from data bus 12 and/or supplies data signals to data bus 12.

In the depicted arrangement of FIG. 1, data bus 12 is a pair of twisted wires that is routed so that each utilization device 10 can be coupled to the data bus. Located at each end of data bus 12 are termination resistors 14, each having a resistance value of $R_0$, which is equal to the characteristic impedance of the twisted wire pair that forms data bus 12. Thus, in the arrangement of FIG. 1, data bus 12 approximates an infinitely long (reflection-less) transmission line. Accordingly, data signals coupled to the data bus by any utilization device 10 propagate toward the ends of the data bus and can be received by any or all other utilization devices 10 that are coupled to data bus 12. Moreover, as shall be described, data signals coupled to data bus 12 by a utilization device that both transmits and receives signals are returned to the utilization device (i.e., a "listen while talking" capability is provided).

Each utilization device 10 is coupled to data bus 12 by means of a bus coupler 16 and an interface unit 18. Extending between each bus coupler 16 and an associated interface unit 18 is a data communications link 20. Each bus coupler 16 is arranged for coupling data signals to data bus 12; receiving data signals from data bus 12; or both. Data communications links 20 provide signal transmission between associated bus couplers 16 and interface units 18, which can be located a substantial distance from their associated bus coupler. Each interface unit 18 provides all necessary signal conditioning for the transmit and receive channels of the associated utilization device 10.

Figure 2:
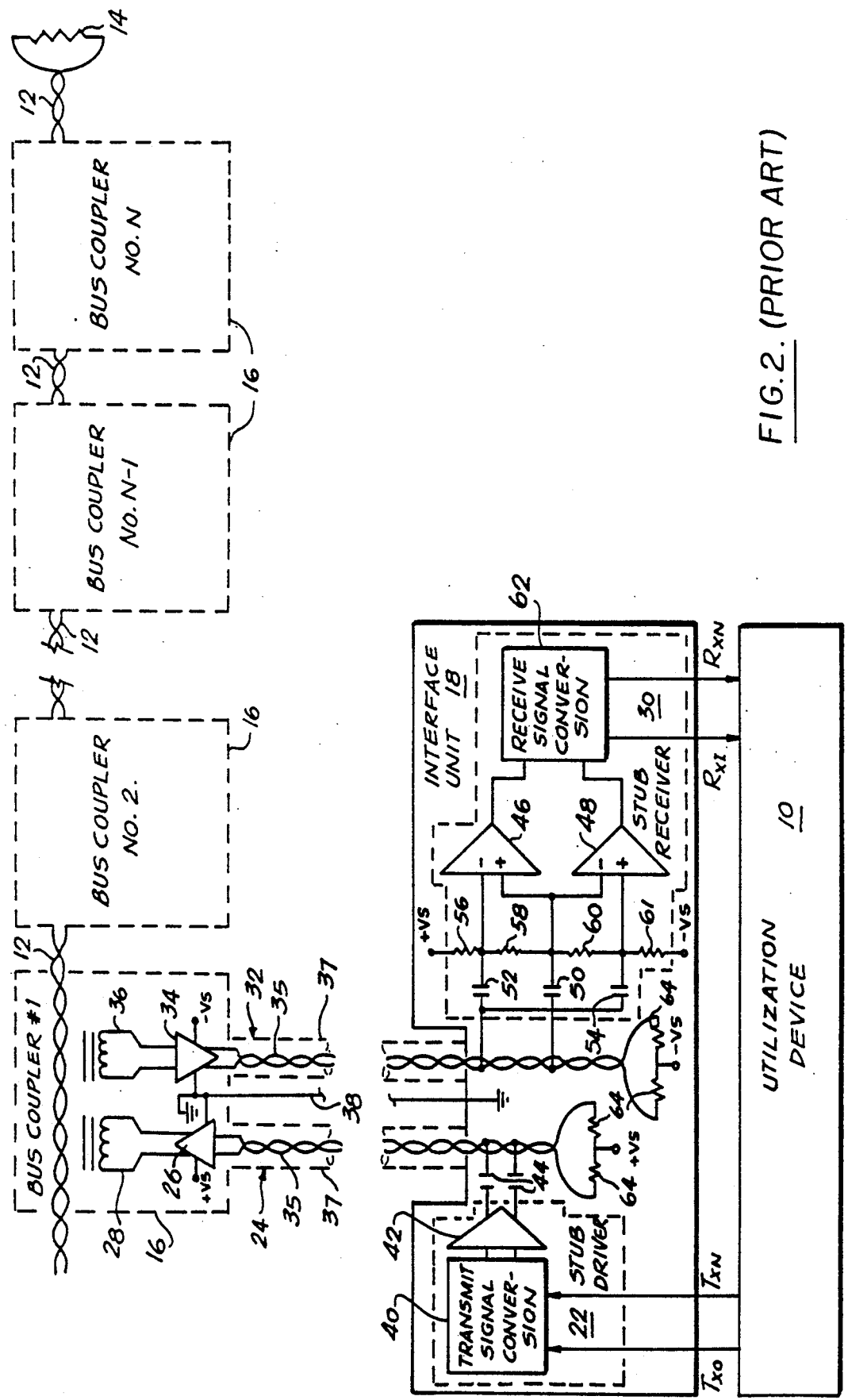
FIG. 2 is a block diagram that illustrates a prior arrangement in which data signals coupled to and from a system data bus are supplied to utilization devices via separately shielded transmit and receive stubs.

FIG. 2 illustrates the type of prior art data communications system that is disclosed and claimed in the previously mentioned U.S. Pat. No. 4,825,450. An understanding of this prior art arrangement is useful in understanding the present invention because the present invention eliminates or alleviates various limitations attendant to systems of the type depicted in FIG. 2.

As is disclosed in U.S. Pat. No. 4,825,450, which disclosure is incorporated herein by reference, data signals can be coupled to and from data bus 12 by means of a bus coupling arrangement that includes a separate transmit coupler and a separate receive coupler. In the data bus system of FIG. 2, the transmit couple includes a stub driver circuit 22; a transmit stub 24; a line driver (amplifier) 26 and a transmit coupler transformer 28. The receive coupler includes: a stub receiver circuit 30; a receive stub 32; a bus receive amplifier 34 and a receive coupler transformer 36. As is indicated in FIG. 2, transmit coupler transformer 28, the associated line driver 26, the receive coupler transformer 36 and the receive amplifier 34 collectively form a bus coupler 16 of the system shown in FIG. 1. As also is indicated in FIG. 2, stub driver 22 and stub receiver 30 are included in an interface unit 18 of the type generally indicated in FIG. 1. In addition, transmit stub 24 and receive stub 32 collectively form a data communication link 20 of FIG. 1.

With continued reference to FIG. 2, the depicted transmit stub 24 and receive stub 32 each include a pair of twisted wires 35 that are individually shielded by braid wire sleeve or jacket 37 to prevent signal coupling between the twisted wire pairs 32 and 24 (i.e., crosstalk). The shielded jackets 37 of transmit stub 24 and receive stub 30 are connected to system common, i.e., ground potential, by a conductor 38 to provide a return path for signals induced in the shielded jackets by the twisted wire pairs 35 and by other electrical or electronic equipment located in the vicinity of transmit stub 24 and receive stub 32 (i.e., electromagnetic interference).

In the currently preferred realizations of the system depicted in FIG. 2, the data signals that are supplied by the utilization devices 10 are in Manchester biphase data signal format and are converted to pairs of relatively high frequency signal pulses ("doublet data signals") for transmission to data bus 12 via transmit stub 24. In FIG. 2, the depicted utilization device 10 supplies the Manchester biphase data signals ($T_{X0}$, $T_{XN}$) to a transmit signal conversion circuit 40 of stub driver 22. Doublet data signals provided by transmit signal conversion circuit 40 are amplified by an amplifier 42, which differentially drives the two conductors of twisted wire pair 35 of transmit stub 24 via coupling capacitors 44. In this arrangement, transmit stub 24 in effect operates as a voltage mode data bus with the terminal ends of the two conductors of twisted wire pair 35 being connected to the input terminals of line driver 26.

As is disclosed in U.S. Pat. No. 4,825,450, line driver 26 provides the necessary signal gain and, in addition, exhibits a low output impedance. The combined effect of the low output impedance of line driver 26 and the turns ratio of transmit coupler transformer 28 is that the impedance presented to the conductors of data bus 12 by transmit coupler transformer 28 is maintained at a relatively low level (typically a fraction of an ohm). Thus, data signals are coupled to data bus 12 without significantly impairing current mode operation of the data bus.

Since data signals coupled to data bus 12 by a line driver 26 of a bus coupler 16 propagate in both directions along data bus 12 (i.e., toward each terminating resistor 14 in FIG. 2), signal currents induced in data bus 12 are coupled to the receive transformers 36 of all other bus couplers and, in addition, are coupled to the receive transformer 36 of the bus coupler 16 that supplies the transmit signal to data bus 12. Coupling signal information that is supplied by a particular utilization device 10 back to the same utilization device via the receive coupler components provides a "listen while talking" feature that is important in autonomous terminal data transmission systems such as the system depicted in FIG. 2. For example, the listen while talking feature allows the utilization devices 10 to recognize transmission clashes, e.g., simultaneous transmission by several utilization devices when operating power is initially applied to the data communications system.

Regardless of whether signal currents that reach a particular receive coupler transformer 36 are induced in data bus 12 by the bus coupler 16 that includes that particular receive coupler transformer 36 or by a different bus coupler, the bus receive amplifier 34 that is associated with the receive coupler transformer provides the required amplification and supplies a differential voltage signal to the two conductors of twisted wire pair 35 of receive stub 32. To minimize the amount of signal power extracted from data bus 12 by the receive coupler circuitry, the turns ratio of receive coupler transformer 36 is relatively high (for example, on the order of 20:1) and the input impedance of bus receive amplifier 34 is relatively low.

Signal voltages, which are coupled to receive stub 32 by bus receive amplifier 34 and are in doublet data signal format, are converted to Manchester biphase signal format by stub receiver 30, which is connected across the conductors of twisted wire pair 35 of receive stub 32. Included in stub receiver 30 of FIG. 2 are first and second comparator circuits 46 and 48 with the noninverting input terminal of comparator 46 and the inverting input terminal of comparator 48 being connected to one wire of twisted pair 35 of receive stub 32 by means of a common coupling capacitor 50. The second wire of twisted pair 35 of receive stub 32 is connected to the inverting input terminal of comparator 46 by means of a capacitor 52 and is connected to the noninverting input terminal of comparator 48 by means of capacitor 54. A voltage divider formed by resistors 56, 58, 60 and 61 provides bias voltages at the input terminals of comparators 46 and 48 to maintain both comparator output levels at a relatively low voltage when receive stub 32 does not supply a doublet data signal. As will be recognized by those skilled in the art and as is described in detail in the referenced U.S. Pat. No. 4,825,450, comparators 46 and 48 thus form a dual comparator circuit that provides output pulses for both the negative going and positive going portions of a received doublet data signal. These output pulses are coupled to a receive signal conversion circuit 62, which converts the signals to Manchester data signal format and couples the Manchester data signals (designated $R_{XI}$ and $R_{XN}$ in FIG. 2) to the associated utilization device 10.

In a typical aircraft environment data bus 12 and bus coupler 16 may be located a substantial distance from readily available sources of power. On the other hand, interface units 18 and utilization devices 10 include a substantial amount of active circuitry and thus either include or are located in close proximity to suitable power supplies. Thus, in arrangements of the type shown in FIG. 2, operating current usually is supplied to line driver 26 and bus receive amplifier 32 of bus coupler 16 via the twisted wire pairs 35 of transmit stub 24 and receive stub 32. In the arrangement shown in FIG. 2, each wire of twisted pair 35 of transmit stub 24 is connected to a positive power supply potential ($+V_S$) by a decoupling resistor 64. Similarly, each wire of twisted wire pair 35 of receive stub 32 is connected to a negative power supply potential ($-V_S$) via a decoupling resistor 64.

As previously noted, the invention disclosed and claimed herein is directed to eliminating or alleviating limitations and disadvantages or drawbacks that are attendant to the type of system shown in FIG. 2. As shall be described in detail, the limitations, disadvantages and drawbacks include limits on the length of transmit stub 24 and receive stub 32 (and hence the allowable distance between data bus 12 and an interface unit 18), size and weight considerations, limitations on system topology, higher than desired system power consumption and higher than desired system signal to noise ratio (susceptibility to electromagnetic interference). Prior to discussing the manner in which the invention is configured and arranged to eliminate or alleviate such limitations and disadvantages or drawbacks, the type of bus coupler that currently is preferred for use in both the type of system shown in FIG. 2 and the invention will be described relative to FIGS. 3 and 4. As shall be recognized upon understanding the invention disclosed and claimed herein, certain features of the coupler depicted in FIGS. 3 and 4 are utilized in the invention, along with additonal features that are important only to the invention.

Figure 3:
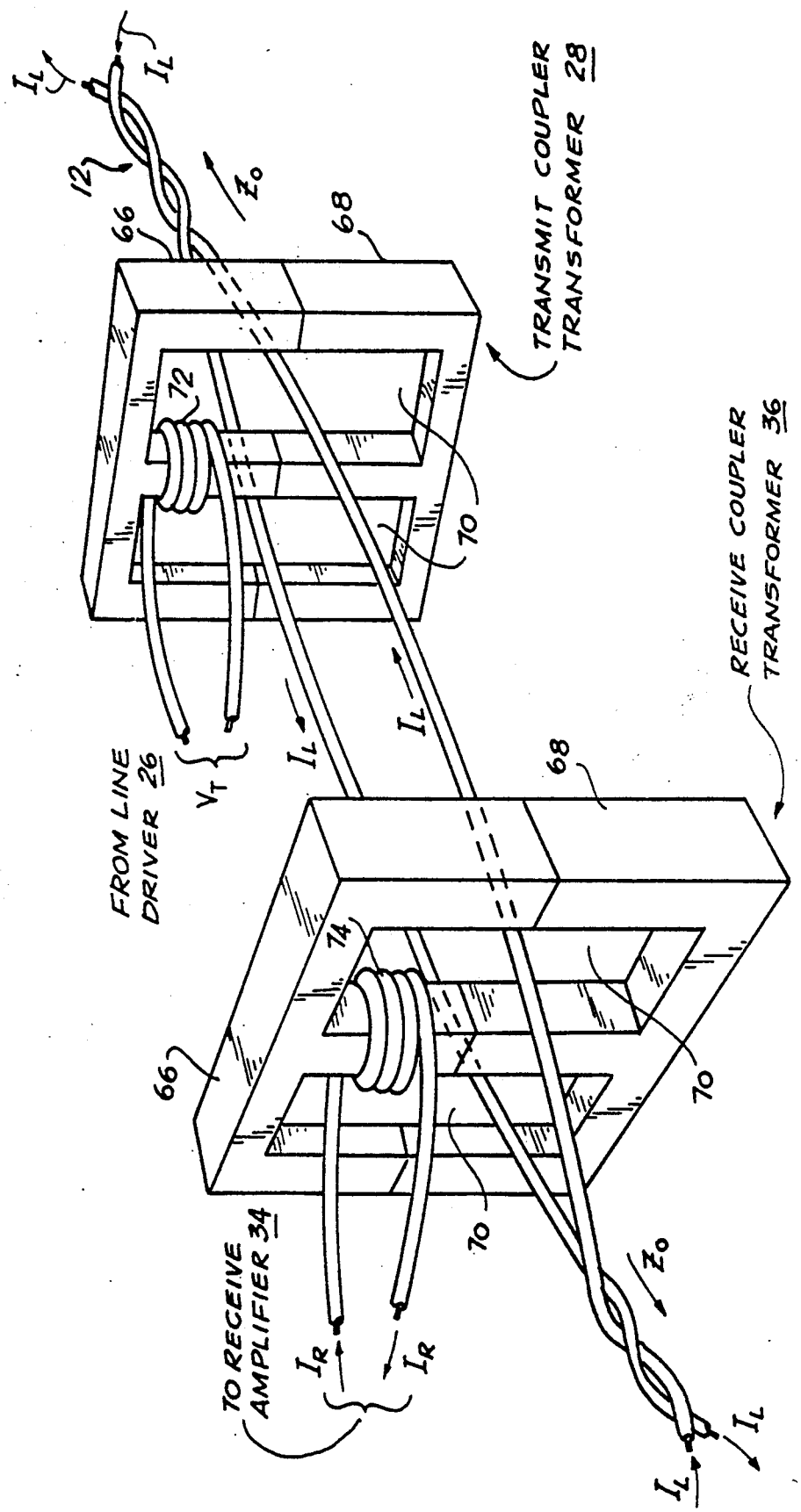
FIG. 3 depicts a prior art arrangement for coupling signals to and from a current mode data bus by means of ferrite core transformers, which can be adopted for use in the stub couplers of the invention.
Figure 4:
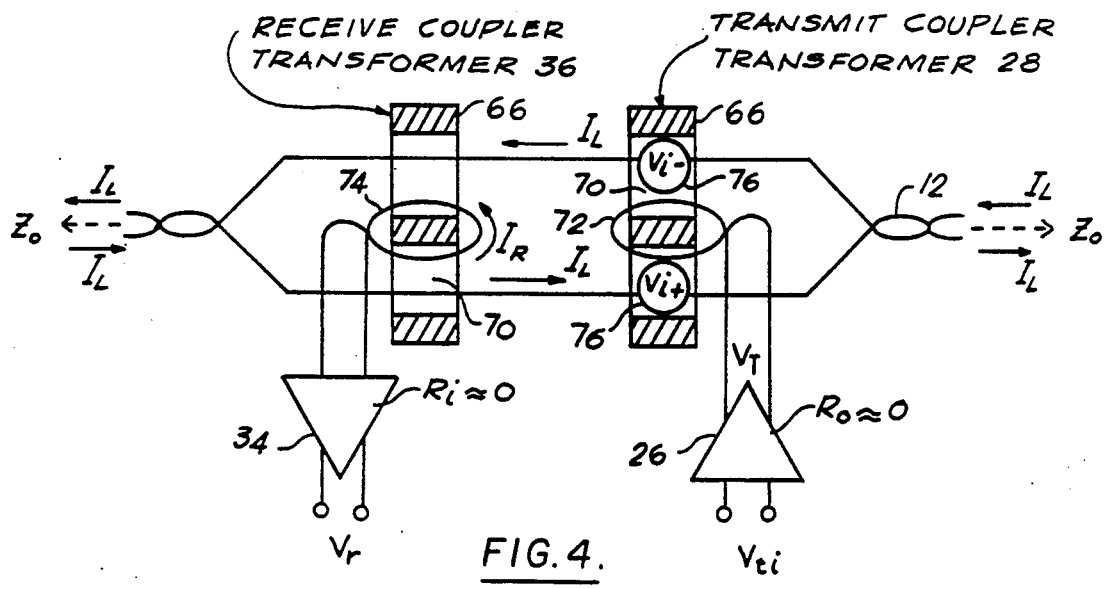
FIG. 4 is an equivalent circuit of the transformer coupling arrangement depicted in FIG. 3.

Referring more specifically to FIGS. 3 and 4, the depicted transmit coupler transformer 28 and receive coupler transformer 36 each are structured and operate in a manner that is disclosed in previously mentioned U.S. Pat. No. 4,264,827, which disclosure is incorporated herein by reference. As is indicated in FIG. 3, both transmit coupler transformer 28 and receive coupler transformer 36 include two separate, disengagable E-shaped ferrite core pieces 66 and 68. When joined together in the manner shown in FIG. 3, the E-shaped ferrite core pieces form a core having two substantially rectangular apertures 70. Wound on the center member of core 66 of transmit coupler transformer 28 is a primary winding 72, which receives signals ($V_T$ in FIG. 3) from line driver 26 (FIGS. 2 and 4). Similarly, a primary transformer winding 74 is wound on the central member of E-shaped core piece 66 of receive coupler transformer 36 for supplying signals ($I_R$ in FIG. 3) to bus receive amplifier 34 (FIGS. 2 and 4). As also is shown in FIG. 3, the conductors of the twisted wire pair that forms data bus 12 pass through apertures 70 of transmit coupler transformer 28 and receive coupler transformer 36, without being twisted in the relatively short distance between transformers 28 and 36. Since the E-shaped core pieces 66 and 68 can be disengaged from one another, the conductors of data bus 12 easily can be installed in or removed from apertures 70. Thus, bus couplers 16 (FIGS. 1 and 2) can be quickly and easily installed and removed without cutting or perforating the insulation or conductors of data bus 12.

The operation of transmit coupler transformer 28 and receive coupler transformer 36 can be understood with reference to FIG. 4. Since, as previously mentioned, the output impedance of line driver 26 is relatively low, the signals induced in data bus 12 by winding 72 of transmit coupler transformer 28 can be characterized by two low impedance voltage sources that are embedded in the conductors of data bus 12 that pass through aperture 70 of transmit coupler transformer 28. These voltage sources are indicated as voltage sources 76 in FIG. 4 and induce voltages, $V_i$, of the indicated polarity. Since each conductor of data bus 12 that passes through aperture 70 of transmit coupler transformer 28 constitutes one-half a turn relative to transformer winding 72, the voltage, $V_i$, induced in each conductor of data bus 12 is $V_T/2N_T$, where $V_T$ is the signal voltage supplied by line driver 26 and $N_T$ is the turns ratio of transmit coupler transformer 28. Since the currents induced in the two conductors of data bus 12 by voltage sources 76 are additive and since each end of data bus 12 is terminated by a resistor (14 in FIG. 1) that is equal to the data bus characteristic impedance ($Z_0$), the current ($I_L$) that is induced in data bus 12 by transmit coupler transformer 28 is equal to $V_T/2N_TZ_0$.

As was described relative to FIG. 2, the input impedance of receive amplifier 34 is relatively low and the turns ratio of receive coupler transformer 36 is relatively high (e.g., on the order of 20:1). Thus, receiver coupler transformer 36 in effect is a current transformer in which winding 74 of FIGS. 3 and 4 exhibits a number of Ampere turns that is equal to the Ampere turns exhibited by the two conductors of data bus 12 that pass through aperture 70 of receiver coupler transformer 36. Since each conductor of data bus 12 corresponds to one-half turn, the current ($I_R$) that is induced in winding 74 of receive coupler transformer 36 is equal to $-I_L/N_R$, where $I_L$ is the signal current flowing in data bus 12 and $N_R$ is the number of turns in winding 74 of receive coupler transformer 36. As was described relative to FIG. 2, current $I_L$ may consist solely of signal current induced in data bus 12 by a transmit coupler transformer of the same bus coupler 16; may consist of signal current induced by the transmit coupler transformers of one or more different bus couplers 16; or, may consist of a combination of signal currents induced by the same bus coupler 16 and additional bus couplers 16.

Figure 5:
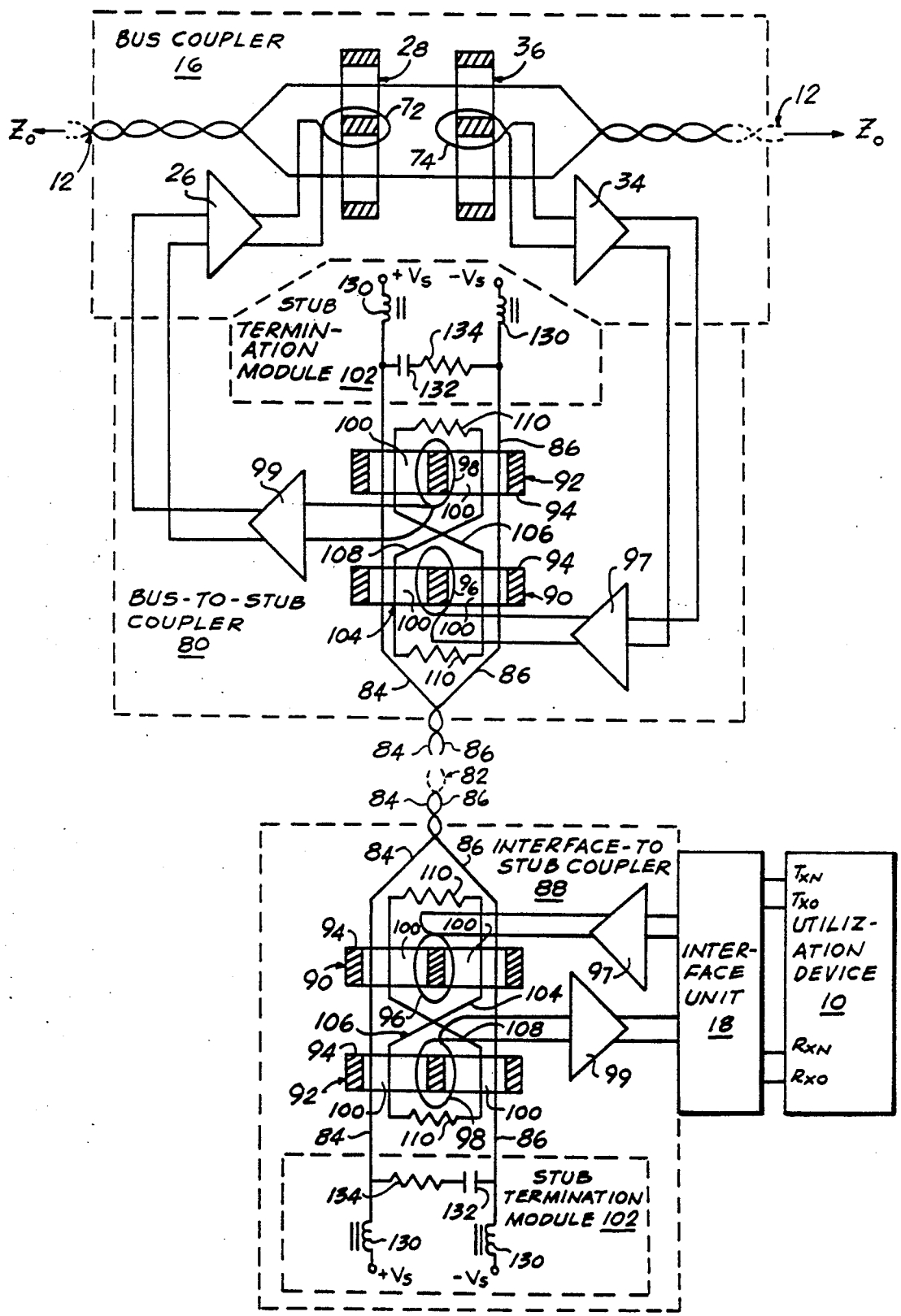
FIG. 5 is a block diagram depicting the manner in which a single utilization device can be coupled to a data communication bus in accordance with the invention.

The invention will now be described with initial reference to FIG. 5, which illustrates the interconnection of a data bus 12 with a utilization device 10 (via an associated interface unit 18). In the arrangement of FIG. 5, data signals are coupled to and from data bus 12 by a bus coupler 16 of the previously described type. Interconnected with bus coupler 16 is a bus-to-stub coupler 80, which is inductively coupled to a transmit-receive stub 82. As is indicated in FIG. 5, transmit-receive stub 82 is an unshielded pair of twisted wires 84 and 86 that extend between bus-to-stub coupler 80 and an identically configured interface-to-stub coupler 88. Connected to interface-to-stub coupler 88 is the interface unit 18 of utilization device 10 that receives signals from and transmits signals to data bus 12 via the depicted bus coupler 16, bus-to-stub coupler 80, transmit-receive stub 82 and interface-to-stub coupler 88.

As shall be described in detail, transmit-receive stub 82 functions as a duplex data communications channel, which in conjunction with bus-to-stub coupler 80 and interface-to-stub coupler 88 provides full duplex data communication between the depicted bus coupler 16 and the depicted utilization device 10. Thus, data signals produced by the utilization device 10 and conditioned by the interface unit 18 of FIG. 5 are coupled to line driver 26 of bus coupler 16 (via interface-to-stub coupler 88, transmit-receive stub 82 and bus-to-stub coupler 80) and are coupled to data bus 12 by transmit coupler transformer 28 of bus coupler 16. Similarly, data signals propagating along data bus 12 are coupled from the data bus by receive coupler transformer 36 and bus receive amplifier 34 of bus coupler 16 and are coupled to the depicted utilization device 10 via bus-to-stub coupler 80, transmit-receive stub 82, interface-to-stub coupler 88 and the signal conditioning circuits of interface unit 18. Moreover, as shall be described relative to FIG. 9, a plurality of utilization devices 10 can be coupled to transmit-receive stub 82 via associated interface units 18 and interface-to-stub couplers 88 in a manner that provides full duplex data communication between each utilization device 10 and bus coupler 16.

With specific reference to FIG. 5, bus-to-stub coupler 80 includes a stub transmit transformer 90 and a stub receive transformer 92, which respectively couple signals to and from transmit-receive stub 82. In the embodiment of the invention shown in FIG. 5, stub transmit transformer 90 and stub receive transformer 92 each include ferrite cores 94 of the type described relative to FIG. 3 (i.e., ferrite cores formed by two separate, disengagable core pieces of E-shaped or other appropriate geometry). Wound on the center member of ferrite core 94 of stub transmit transformer 90 is a primary winding 96, which is connected to the output terminals of a stub driver (amplifier) 97. Signals coupled from data bus 12 by bus coupler 16 are supplied to the input terminals of stub driver 97 by bus coupler receive amplifier 34. Wound on the central member of ferrite core 94 of stub receive transformer 92 is a primary winding 98, which is connected to the input terminals of a stub receive amplifier 99. The output terminals of stub receive amplifier 99 are connected to the input terminals of line driver 26 of bus coupler 16 so that signals coupled from transmit-receive stub 84 by stub receive transformer 92 are induced in data bus 12 by transmit coupler transformer 28 of bus coupler 16.

To inductively couple transmit-receive stub 82 to stub transmit transformer 90 and stub receive transformer 92, each wire 84 and 86 of the twisted wire pair that forms transmit-receive stub 82 passes through an aperture 100 of stub receive transformer 92 and stub transmit transformer 90 without being twisted in the relatively short distance between the ferrite cores 94 of the two transformers. Connected to the ends of wires 84 and 86 of transmit-receive stub 82 that pass outwardly through apertures 100 is a stub termination module 102. As shall be described, stub termination module 102 provides the terminating impedance for transmit-receive stub 82 and, in addition, allows the active circuitry of bus-to stub coupler 80 and bus coupler 16 (including stub driver 97, line driver 26, stub receive amplifier 99 and bus coupler receive amplifier 34) to be powered by a power supply that is located at the opposite end of transmit-receive stub 82 (e.g., a power supply included in or located near interface unit 18).

Bus-to-stub coupler 80 also includes a cancellation loop 104, that is inductively coupled to both primary winding 96 of stub transmit transformer 90 and primary winding 98 of stub receive transformer 92. In the depicted embodiment, cancellation loop 104 is formed by a pair of wires 106 and 108 that extend through apertures 100 of ferrite cores 94 of stub transmit transformer 90 and stub receive transformer 92, with the wires 106 and 108 crossing over one another so that cancellation loop 104 in effect forms a figure-8 that encircles the central members of cores 94 of stub transmit transformer 90 and stub receive transformer 92. As is indicated in FIG. 5, series resistance is included in cancellation loop 104 for controlling cancellation loop current. In the depicted embodiment, the series resistance is provided by two resistors, each of which is identified by reference numeral 110 in FIG. 5. More specifically, in the arrangement shown in FIG. 5, one of the resistors 110 is connected between the ends of cancellation loop wires 106 and 108 that extend through apertures 100 of stub transmit transformer 90 and the second resistor 110 is connected between the ends of wires 106 and 108 that extend from apertures 100 of stub receive transformer 92.

As was previously mentioned, the circuit arrangement of interface-to-stub coupler 88 that is shown in FIG. 5 is identical to the configuration of bus-to-stub coupler 80. As also has been indicated, interface-to-stub coupler 88 functions to: couple signals to transmit-receive stub 82 that are provided by utilization device 10 (via interface unit 18); and, in addition, functions to couple to utilization device 10 (via interface unit 18) data signals that propagate along data bus 12 and are coupled to transmit-receive stub 82 by bus-to-stub coupler 80. To provide a signal path for signals being coupled to data bus 12, the input terminals of stub driver 97 of interface-to-stub coupler 88 are connected to the output terminals of interface unit 18 (e.g., the output terminals of amplifier 42 of the interface unit 18 that is shown in FIG. 2). To provide a signal path for signals being received from data bus 12, the output terminals of stub receive amplifier 99 of interface-to-stub coupler 88 are connected to the input terminals of interface unit 18 (e.g., the input terminals of interface unit stub receiver 30 in FIG. 2).

Figure 6:
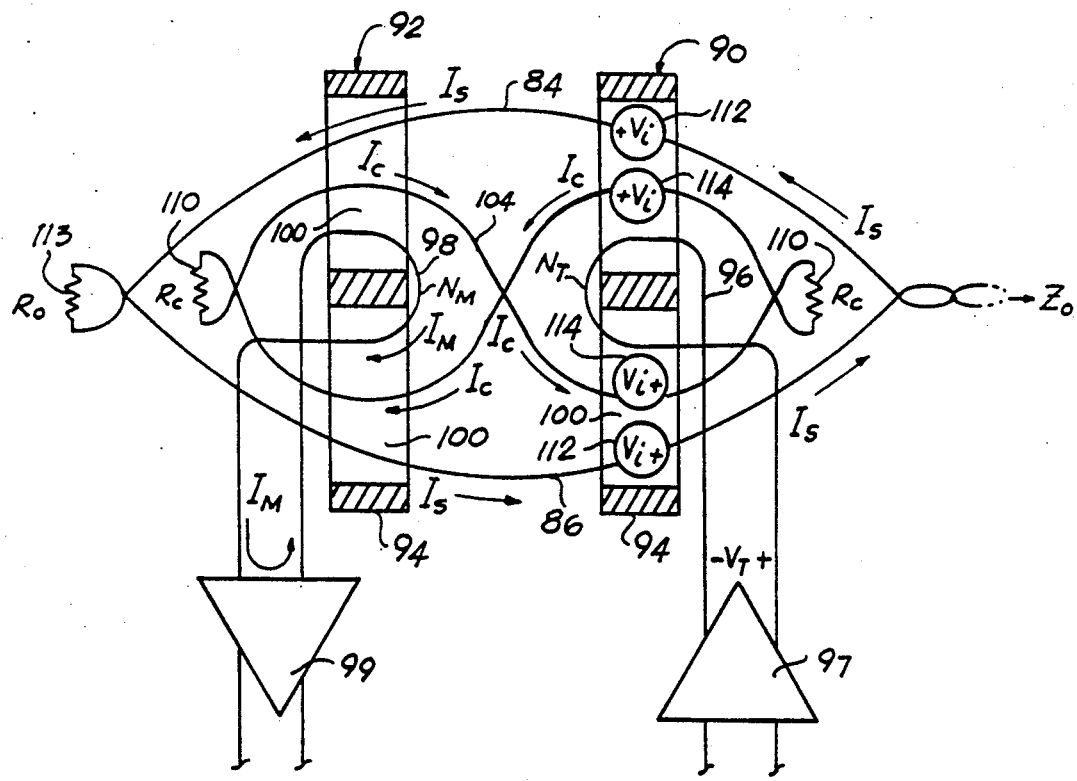
FIG. 6 is an equivalent circuit of the stub couplers used in the arrangement of FIG. 5.
Figure 7:
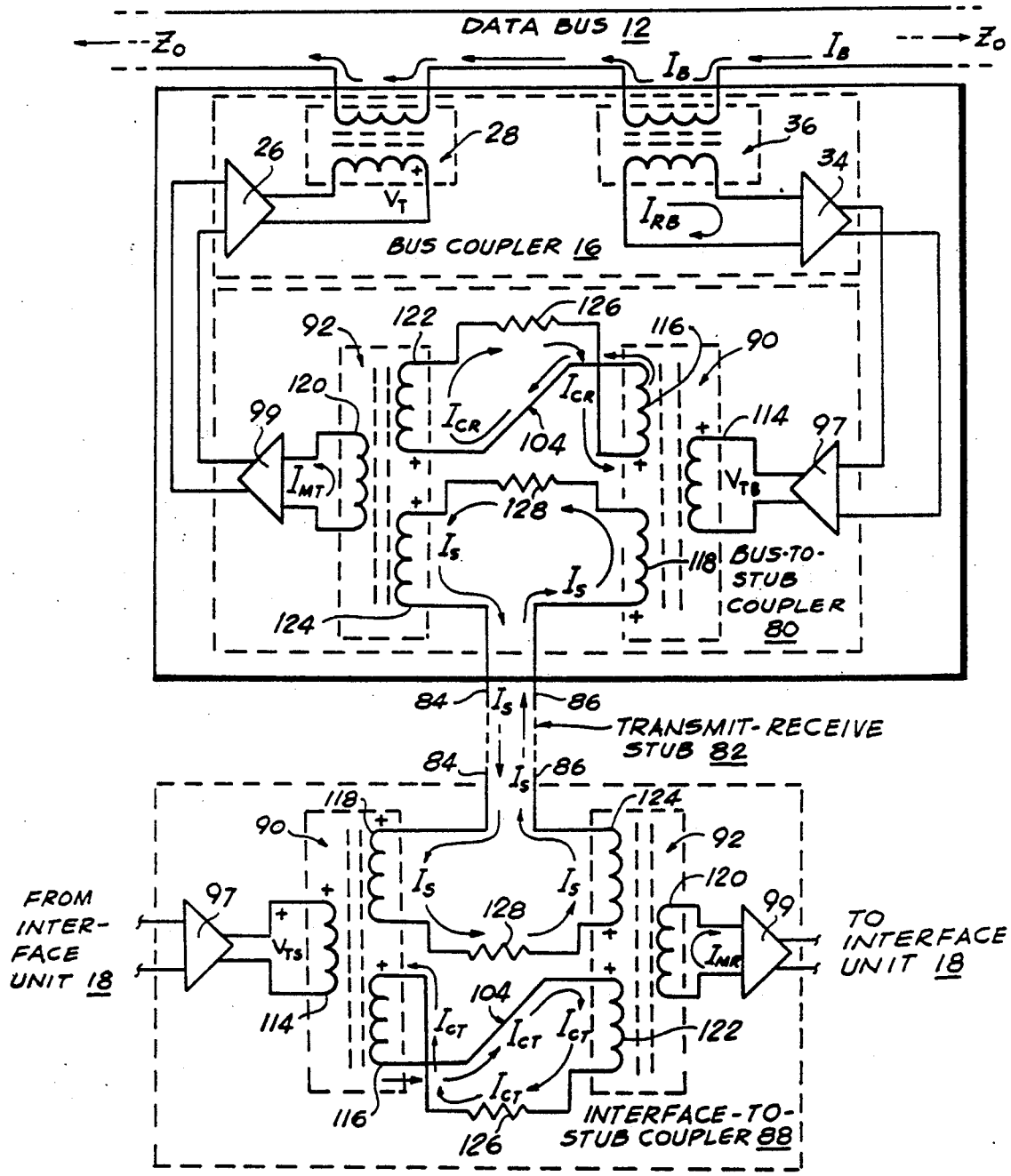
FIG. 7 is an equivalent circuit that corresponds to the arrangement shown in FIG. 5 for coupling signals between a data bus and a utilization device.

The operational aspects of the arrangement shown in FIG. 5 can be understood with reference to the equivalent circuits depicted in FIGS. 6 and 7. In this regard, FIG. 6 depicts an equivalent circuit that corresponds to bus-to-stub coupler 80 (and the identically arranged interface-to-stub coupler 88) and FIG. 7 is an equivalent circuit that corresponds to the overall arrangement of FIG. 5.

Comparing the equivalent circuit of FIG. 6 with the previously discussed equivalent circuit of bus coupler 16 that is shown in FIG. 4, it can be seen that, except for cancellation loop 104, the equivalent circuits exhibit identical circuit topology. By analogy to the equivalent circuit of FIG. 4, it can be recognized that the signals induced in transmit-receive stub 82 by primary winding 96 of stub transmit transformer 90 can be characterized by low impedance voltage sources that are embedded in each conductor of transmit-receive stub 82 as long as stub receive amplifier 97 exhibits a relatively low output impedance. These voltage sources are indicated as voltage sources 112 in the equivalent circuit of FIG. 6 and induce voltages, $V_i$ of the indicated polarity. Since each wire 84 and 86 of transmit-receive stub 82 in effect forms one-half a turn relative to primary winding 96 of the stub transmit transformer 90, $V_i$ is equal to $V_T/2N_T$, where $V_T$ is the signal voltage supplied by stub driver 97 and $N_T$ is the turns ratio of stub transmit transformer 90 (i.e., the number of turns included in primary winding 96 of the disclosed embodiment). Thus, data signals provided to stub transmit transformer 90 by stub driver 97 induce signal currents in transmit-receive stub 82 that are equal to $V_T/N_T(Z_0+R_0)$, where $R_0$ the impedance presented to transmit-receive stub 82 by stub termination module 102 of FIG. 5 and is represented in FIG. 6 by resistor 113, and $Z_0$ represents the characteristic impedance of the twisted wire pair that forms transmit-receive stub 82. By additional analogy to the arrangement of FIG. 4, it can be recognized that the current induced in winding 98 of stub receive transformer 92 is equal to $-(I_S-I_C)/N_M$, where $I_S$ represents the current flowing in transmit-receive stub 82, $I_C$ represents the current flowing in cancellation loop 104, $N_M$ represents the turns ratio of stub receive transformer 92 (i.e., the number of turns in primary winding 98 in the disclosed embodiment), and the ratio of the input impedance of stub receive amplifier 99 to the turns ratio $N_M$ is relatively low.

Since cancellation loop 104 passes through apertures 100 of stub transmit transformer 90 in a manner identical to passage of transmit-receive stub 82, it can be recognized that the signals induced in cancellation loop 104 also can be characterized by two low impedance voltage sources that are identified as voltage sources 114 in FIG. 6 and are embedded in the conductors that form cancellation loop 104. Since the total loop resistance of cancellation loop 104 is $2R_C$, where $R_C$ is resistance value of each resistor 110, and since the voltage induced in wires 106 and 108 of cancellation loop 104 that pass through aperture 100 of stub transmit transformer 90 is identical to the voltage, $V_i$, induced in wires 84 and 86 of transmit-receive stub 82, it can be recognized that the current induced in cancellation loop 104 ($I_C$) is equal to $V_T/2N_TR_C$. Thus, if both $R_0$ and $R_C$ are established equal to $Z_0$, a cancellation loop current ($I_C$) is obtained that is equal in magnitude to the current induced in transmit-receive stub 82 ($I_S$).

In view of the above-discussed structure and operation of stub receiver transformer 92, it thus can be recognized that data signals induced in transmit-receive stub 82 by stub driver 97 do not result in a signal being coupled to stub receive amplifier 99. That is, when stub transmit transformer 90 induces a data signal in transmit-receive stub 82, the data signal induces equal and opposite currents ($I_S$ and $I_C$) in primary winding 98 of stub receive transformer 92 so that the signal current, $I_M$, coupled to stub receive amplifier 99 is equal to zero. However, in view of the previously described operation of the prior art bus coupler (FIGS. 3 and 4), it can be recognized that data signals induced in transmit-receive stub 82 by stub transmit transformer 90 are available to any other device that is coupled to transmit-receive stub 82 and, in addition, that signals induced in transmit-receive stub 82 by a signal source other than stub transmit transformer 90 will result in a current of magnitude $I_R/N_M$ being coupled to stub receive amplifier 99 (where $I_R$ represents the component of transmit-receive stub current ($I_S$) induced in transmit-receive stub 82 by such a signal source).

FIG. 7 is an equivalent circuit that corresponds to the arrangement of data bus 12, bus coupler 16, bus-to-stub coupler 80, transmit-receive stub 82 and interface-to-stub coupler 88 of FIG. 5. In FIG. 7, transmit transformer 28 and receive transformer 36 of bus coupler 16 are depicted as conventional magnetic core transformers that include a primary winding and a single secondary winding. In a similar manner, each stub transmit transformer 90 and each stub receive transformer 92 of bus-to-stub coupler 80 and interface-to-stub coupler 88 is depicted as a conventional magnetic core transformer having a primary winding and two secondary windings. More specifically, in the equivalent circuit of FIG. 7, the primary winding 114 of each stub transmit transformer 90 corresponds to primary winding 96 of FIG. 5 and the two secondary windings 116 and 118 respectively correspond to the conductive coupling that results from passage of cancellation loop 104 and transmit-receive stub 82 through apertures 100 of stub transmit transformer 90. Similarly, the primary winding 120 of each stub receive transformer 92 corresponds to primary winding 98 in FIG. 5 and the secondary windings 122 and 124 of transformer 92 in FIG. 7 respectively correspond to the previously described passage of cancellation loop 104 and transmit-receive stub 82 through apertures 100 of stub receive transformer 92 of FIG. 5.

In the magnetic core transformer equivalent circuit of FIG. 7, each cancellation loop 104 is formed by the interconnection of a stub transmit transformer secondary winding 116 and a stub receive transformer secondary winding 122. In the cancellation loops 104 of FIG. 7, cancellation loop current is controlled by a resistor 126 which is connected between a terminal of stub transmit transformer secondary winding 116 and a terminal of stub receive transformer secondary winding 122 in both bus-to-stub coupler 80 and interface-to-stub coupler 88. Each resistor 126 corresponds to the resistors 110 that are employed in each cancellation loop 104 of FIG. 5. Thus, each resistor 126 exhibits a resistance value that is substantially equal to twice the characteristic impedance of transmit-receive stub 82 (i.e., a resistance of $2Z_0$). To complete the cancellation loops 104 of FIG. 7, the second terminal of stub transmit transformer secondary winding 116 is interconnected with the second terminal of stub receive transformer secondary winding 122.

To achieve the coupling of signals to and from transmit-receive stub 82 in the manner described relative to the FIGS. 5 and 6, one terminal of each stub transmit transformer secondary winding 118 and one terminal of each stub receive transformer secondary winding 124 is connected to the wires of the twisted wire pair that form transmit-receive stub 82. In both bus-to-stub coupler 80 and interface-to-stub coupler 88, the second terminals of stub transmit transformer secondary winding 118 and stub receive transformer secondary winding 124 are interconnected by a resistor 128. Resistor 128 corresponds to resistor 113 of the previously described equivalent circuit of FIG. 6 (i.e., each resistor 128 exhibits a resistance value that is equal to the characteristic impedance of transmit-receive stub 82).

The manner in which data signals are coupled to and from data bus 12 in accordance with the invention can be recognized by considering a situation in which the utilization device 10 that is associated with interface-to-stub coupler 88 of FIG. 7 provides a data signal ($V_T$) that is to be coupled to data bus 12 (i.e., the utilization device is transmitting) and, in addition, a second data signal ($I_{BR}$) is propagating along data bus 12. Under these conditions, the data signal flowing in transmit-receive stub 82 can be represented by two components. The first signal component ($I_{TS}$) is the data signal current being coupled to data bus 12 and is induced in transmit-receive stub 82 by stub transmit transformer 90 of interface-to-stub coupler 88. The second signal component ($I_{RS}$) is the data signal current being coupled to the utilization device 10 from data bus 12 and is induced in transmit-receive stub 82 by stub transmit transformer 90 of bus-to-stub coupler 80.

Considering first operation of the invention for coupling current $I_{TS}$ to data bus 12, it can be noted that coupling of the transmit-receive stub current $I_S$ to stub receive transformer 92 of bus-to-stub coupler 80 (by secondary winding 124 in FIG. 7 and by passage of transmit-receive stub wires 84 and 86 through apertures 100 of transmit receive transformer 92 in FIGS. 5 and 6), results in bus-to-stub coupler receive amplifier 99 receiving a signal current ($I_{MT}$ in FIG. 7) that is equal to $-(I_S - I_{CR})/N_{RB}$, where $N_{RB}$ represents the turns ratio of stub receive transformer 92 of bus-to-stub coupler 80 (the number of turns in primary winding 98 in FIGS. 5 and 6; ratio of the number of turns in winding 120 to windings 122 and 124 in FIG. 7) and where $I_{CR}$ represents the magnitude of the current flowing in cancellation loop 104 of bus-to-stub coupler 80. Since $I_S = I_{RS} + I_{TS}$ and since $I_{RS}$ and $I_{CR}$ (both supplied by transmit transformer 90 of bus-to-stub coupler 80) are equal, the current $I_{MT}$ that is supplied to bus-to-stub coupler receive amplifier 99 is thus equal to $I_{TS}/N_{RB}$. By analogy to the equivalent circuit of FIG. 6 it thus can be recognized that $I_{TS} = V_{TS}/2N_{TI}Z_0$, where $V_{TS}$ represents the voltage supplied to coupler stub transmit transformer 90 of interface-to-stub coupler 88 $N_{TI}$ is the turns ratio of stub transmit transformer 90, i.e., the turns ratio of primary winding 114 to each secondary winding 116 and 118; the number of turns in primary winding 96 of FIG. 6) and $Z_0$ is the characteristic impedance of transmit-receive stub 82 (and is the resistance value of each resistor 128). Since the output terminals of stub receive amplifier 99 of bus-to-stub coupler 80 are connected to line driver 26 of bus coupler 16, a data signal that is representative of the data signal supplied to interface-to-stub coupler 88 by a utilization device 10 is coupled to data bus 12 without inducing a component of data bus current that is representative of signals received from the data bus.

Operation of the invention in coupling data signals from data bus 12 to the receive circuitry of a utilization device 10 (via its associated interface unit 18), is analogous to the above-described operation for coupling data signals to data bus 12. In this regard, in the situation being considered, the signal ($I_B$) propagating along data bus 12 can be represented by two signal components: a current $I_{BT}$, which corresponds to the above-described signal current that is coupled to data bus 12 from utilization device 10 and a current $I_{BR}$, which was induced in data bus 12 by another signal source (e.g., a different utilization device 10). Operating in a manner identical to the previously discussed operation of interface-to-stub coupler stub transmit transformer 90, stub transmit transformer 90 of bus-to-stub coupler 80 induces the previously mentioned signal component $I_{RS}$ of $I_S$ in transmit-receive stub 82. Since the data bus signal current includes signal components $I_{BT}$ and $I_{BR}$, $I_{RS}$ can be represented as $I_{SS} + I_{BS}$, where $I_{SS}$ is the component of $I_{RS}$ that results from the signal $I_{BT}$ induced in data bus 12 by the utilization device) and $I_{BS}$ is the component of $I_{RS}$ that results from one or more other data signal propagating along data bus 12. Thus, the current induced in stub receive transformer 92 of interface-to-stub coupler 88 (winding 124 in FIG. 7; inductive coupling of wires 84 and 86 in FIGS. 5 and 6) is equal to $I_{TS} + I_{SS} + I_{BS}$. Stub receive transformer 92 of interface-to-stub coupler 88 also receives a cancellation loop current $I_{CT}$ (via winding 122 in FIG. 7; inductive coupling of wires 106 and 108 in FIGS. 5 and 6). Thus, the current, $I_{MR}$, supplied to receive amplifier 99 of interface-to-stub coupler 88 is equal to $-(I_{TS} + I_{SS} + I_{BS} - I_{CT})/N_{RS}$, where $N_{RS}$ represents the turns ratio of receive transformer 92 (i.e., number of turns in primary winding 98 in FIGS. 5 and 6; ratio of number of turns in windings 122 and 124 in FIG. 7). However, $I_{TS}$ and $I_{CT}$ (both supplied by stub transmit transformer 90 of interface-to-stub coupler 88 are of equal magnitude. Thus, the data signal coupled to the utilization device (via stub receive amplifier 99 and interface unit 18) is representative only of the current flowing in data bus 12 and includes a signal component representative of the data signal coupled to the data bus by the same utilization device (listen-while-talk capability) as well as a signal component representative of all other data signals supplied to data bus 12 by different utilization devices on other signal sources.

Comparing the above-described structure and operation of the invention with the prior art arrangement of FIG. 2, it can be recognized that, in essence, the invention provides a data communications system in which the data bus and each communication link that interconnects the data bus with a system utilization device is a duplex communications channel formed by an unshielded twisted wire pair that operates in the current mode. The use of a current mode unshielded twisted wire pair as the communication link between the utilization devices and the data bus 12 results in significant system advantages. In this regard, as compared to the shielded transmit and receive stubs (24 and 32 in FIG. 2), an unshielded twisted wire pair transmit-receive stub 82 of FIGS. 5-7 exhibits lower signal attenuation and a higher characteristic impedance. The lower stub signal attenuation allows transmit-receive stub 82 to be as long as 70 meters (approximately 230 feet), which is more than twice the maximum length possible when shielded twisted pair transmit stub 24 and receive stub 32 of FIG. 2 are employed. Realizations of the invention that employ transmit-receive stubs no longer than 50 meters are especially advantageous in that such realizations do not impose stringent design requirements on the system amplifiers and signal conditioning circuits.

The higher characteristic impedance provided by transmit-receive stub 82 results in reduced system power requirements. More specifically, in the prior art arrangement of FIG. 2, line driver 26 and stub driver 30 must drive transmit stub 24 and receive stub 32 at relatively high power levels to provide signals of sufficient magnitude. On the other hand, in the practice of the invention, the relatively high characteristic impedance of transmit-receive stub 82 allows stub driver 97 to operate at lower power levels and, as a result, transmit-receive stub 82 consumes less power than the prior art arrangement. For example, in one proposed application of the invention, the power consumption of each transmit-receive stub 82 is estimated to be 0.55 watts whereas the power consumption for the prior art arrangement of FIG. 2 would be 4 watts.

Since the invention in effect replaces the prior art shielded twisted wire transmit stubs and receive stubs with a single unshielded twisted wire pair, the invention also offers substantial weight savings. For example, a cable that includes two shielded twisted wire pairs of the type discussed relative to FIG. 2 weighs on the order of 20 pounds per thousand feet, whereas unshielded twisted wire that is suitable for use as transmit-receive stub 82 weighs on the order of 5 pounds per thousand feet. Cost savings also are provided since unshielded twisted wire pairs that is suitable for use as transmit-receive stub 82 costs less than the shielded wire twisted pairs that were utilized by the prior art.

As was previously mentioned, the prior art arrangement of FIG. 2 for supplying operating current to line driver 26 and receive amplifier 34 of bus coupler 16 via the twisted wire pairs of transmit stub 24 and stub receiver 30 may not provide as high a common mode rejection ratio as is desired. As a result, the prior art system may exhibit a susceptibility to electromagnetic interference that also is higher than desired. A significant improvement in common mode rejection ratio is obtained in realizations of the invention that utilize the previously mentioned stub termination modules 102 (FIG. 5) to couple operating power to the active circuitry of bus coupler 16 and bus-to-stub coupler 80 via the conductors of the transmit-receive stub 82. More specifically, as is shown in FIG. 5, the depicted stub termination module 102 includes inductors 130 that are connected in series with wires 84 and 86 of transmit-receive stub 82. Connected between wires 84 and 86 is the series combination of a capacitor 132 and a resistor 134. In this arrangement, the second terminals of inductors 130 of the stub termination module 102 that is remotely located from bus coupler 16 and bus-to-stub coupler 80 are connected to positive and negative operating potentials ($+V_S$ and $-V_S$ in FIG. 7). The second terminals of inductors 130 of the stub termination module 102 that is packaged with or located proximate to bus coupler 16 and bus-to-stub coupler 80 are connected to supply appropriate operating current to the active circuitry of bus coupler 16 and bus-to-stub coupler 80 (i.e., stub driver 97, stub receive amplifier 99, line driver 26 and bus receive amplifier 34 in FIG. 5).

In operation, resistors 134 provide the previously discussed termination impedances for transmit-receive stub 82 (i.e., resistors 134 correspond to resistors 128 in the equivalent circuit of FIG. 7). The capacitors 132 are blocking capacitors that prevent direct current flow through resistors 134. Inductors 130 decouple the power supplies utilized to provide the operating current and the circuits being powered by the operating current from transmit-receive stub data signal currents. Accordingly, the inductors 130 are relatively small (50 microhenries in one realization of the invention). Regardless of the inductance value exhibited, inductors 130 should be of matched value to maintain circuit balance, which is required for optimum performance from the standpoint of electromagnetic interference.

It will be noted by those skilled in the art that the above-described arrangement of stub termination modules 102 and transmit-receive stub 82 for supplying DC operating current results in the generation of magnetic flux in stub transmit transformer 90 and stub receive transformer 92 of both bus-to-coupler 80 and interface-to-stub coupler 88. However, in the practice of the invention, the resulting flux density is not high enough to adversely bias or saturate the transformer cores. For example, in one realization of the invention depicted in FIG. 7 in which an operating current of 200 milliamps is supplied via wires 84 and 86 of transmit-receive stub 82 and each ferrite core 94 exhibits a magnetic path length of 3.9 centimeters, the magnetizing force (according to Ampere's Law) is 0.06 Oersted. Since the magnetization curve for the transformers remains linear to a value of at least 0.6 Oersted, operation of the stub transmit transformers and stub receive transformers is not adversely affected.

Figure 8A:
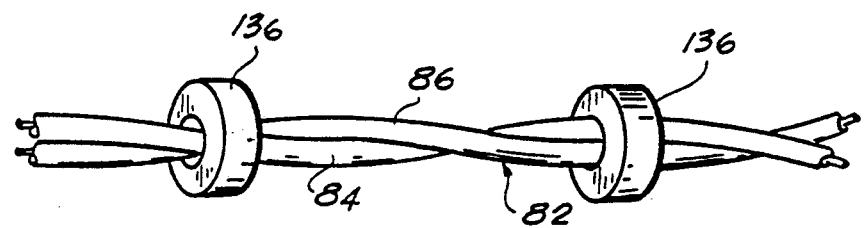
FIGS. 8A and 8B depict alternative magnetic shielding arrangements that can be used in the invention to further reduce system susceptibility of the transmit-receive stubs to electromagnetic interference.
Figure 8B:
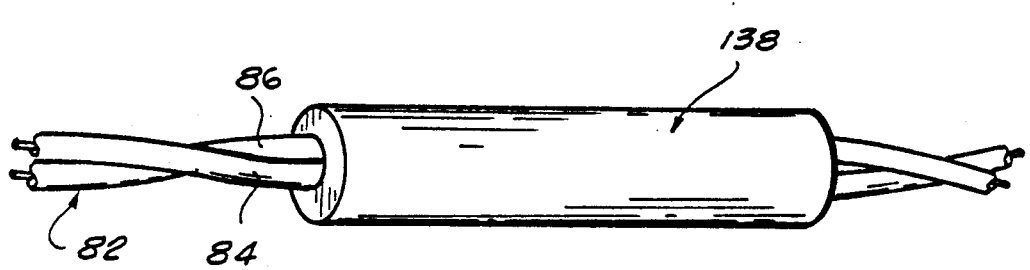

It also will be recognized by those skilled in the art that embodiments of the invention in which operating current is applied to bus coupler 16 and bus-to-stub coupler 80 via transmit-receive stub 82 differ from the equivalent circuit shown in FIG. 7 in that the current path for the transmit-receive stub signal currents ($I_S$ in FIG. 7) is not a "floating" (electrically isolated) balanced circuit. Specifically, interconnecting stub termination module 102 of interface-to-stub coupler 88 to a power supply circuit references transmit-receive stub 82 to aircraft ground potential or an equivalent system common potential. Thus, electromagnetic radiation generated by equipment or other sources can induce electromagnetic interference in transmit-receive stub 82. In situations in which additional protection against electromagnetic interference is desired or necessary, such protection can be provided without fully encasing transmit-receive stubs 82 with a conductive jacket or shield, which would result in undesired higher signal attenuation, undesired lower characteristic impedance and added weight and cost. For example, as is shown in FIG. 8A, magnetic shielding of a transmit-receive stub 82 can be provided by spaced apart ferrite cores 136 that are of toroidal geometry and closely surround twisted wires 84 and 86 of a transmit-receive stub 82. Alternatively, or in addition, a light weight elastomeric jacket 138 of relatively high magnetic permeability can be formed or placed around wires 84 and 86 of transmit-receive stub 82. Since the data signals propagating along transmit-receive stub 82 are differential current mode signals (i.e., equal and opposite currents flow in twisted wires 84 and 86), magnetically shielding transmit-receive stub 82 in the above-described manner causes little or no attenuation of the system data signals. On the other hand, conducted common mode signals (noise) are attenuated and the magnetic shielding substantially isolates transmit-receive stub 82 from electromagnetic noise energy that otherwise could induce noise signals in the transmit-receive stub.

Figure 9:
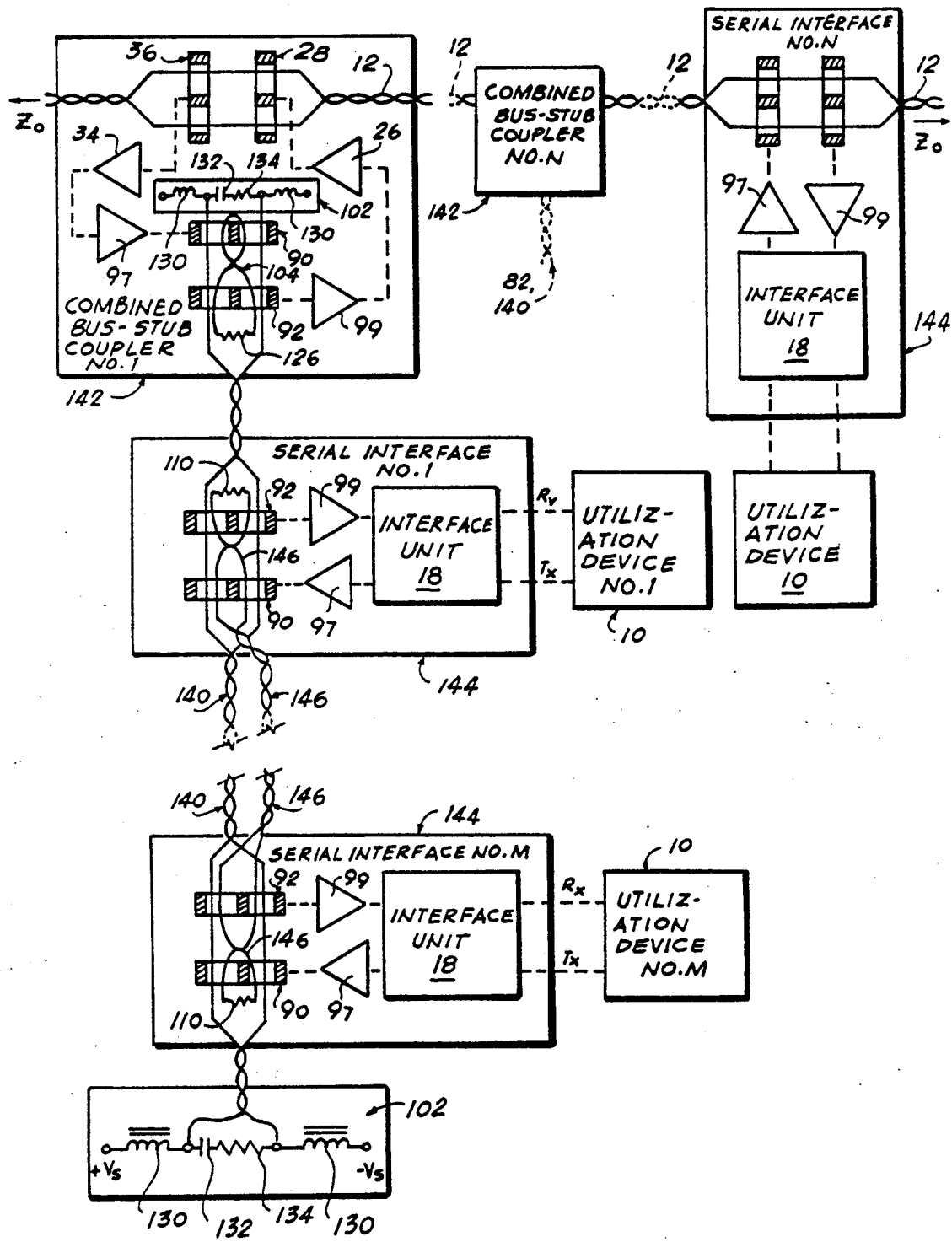
FIG. 9 is a block diagram that illustrates an arrangement of the invention that allows a number of utilization devices to be coupled to the system data bus by means of a single transmit-receive stub.

The invention offers even further advantages in situations in which a plurality of utilization devices 10 that are to be coupled to a data bus 12 are located in close proximity to one another. This aspect of the invention is illustrated in FIG. 9, which depicts a plurality of utilization devices 10 (utilization devices 1, 2, ..., m) which are coupled to a single transmit-receive stub 140. As is indicated in FIG. 9, transmit-receive stub 140 is a pair of unshielded twisted wires that extends between a combined bus-stub coupler 142 and a stub termination module 102 of the previously described type. Combined bus-stub coupler 142 includes, as a single unit, a bus coupler 16, bus-to-stub coupler 80 and a termination module 102. As is shown in FIG. 9, the components of combined bus-stub coupler 142 (i.e., the included bus coupler, bus-to-stub coupler and termination module) are interconnected in the manner described relative to FIG. 5. Thus, data signals coupled from the system data bus 12 are induced in transmit-receive stub 140 without recoupling (reflecting) the received signals into data bus 12 and, further, so that data signals induced in transmit-receive stub 140 by a utilization device 10 are coupled to data bus 12.

Each utilization device 10 in FIG. 9 that couples signals to and receives signals from data bus 12 is coupled to transmit-receive stub by an associated serial interface module 144 (serial interface modules 1, 2, ..., m in FIG. 9). Each serial interface module 144 includes, as a single unit, the circuit components of the previously described interface unit 18 and interface-to-stub coupler 88. To couple each serial interface 144 to transmit-receive stub 140, the conductors of transmit-receive stub 140 extend through apertures of the ferrite cores of the stub transmit transformer 90 and stub receive transformer 92 that are included in each serial interface. Specifically, as was described relative to FIG. 5 and the equivalent circuit of FIG. 6, the wires that form transmit-receive stub 140 in effect form a single turn winding of the stub transmit transformer 90 and the stub receive transformer 92 and are not twisted in the region that separates the two transformers of each serial interface 144.

Each serial interface module 144 (modules 1, 2, ..., m) that is coupled to transmit-receive stub 140 includes a cancellation loop 146 that is shared with all other serial interface modules 144 that are coupled to transmit-receive stub 140. In the arrangement of FIG. 9, the common cancellation loop 146 is an unshielded twisted wire pair that extends between the serial interface modules 144 and is substantially identical to the twisted wire pair that forms transmit-receive stub 140. Thus, transmit-receive stub 140 and cancellation loop 146 are transmission lines that exhibit substantially identical electrical characteristics, including characteristic impedance and attenuation.

Within each serial interface module 144, the wires of the twisted wire pair that forms common cancellation loop 146 encircle the central members of the ferrite cores of stub transmit transformer 90 and stub receive transformer 92 in the manner described relative to FIGS. 5 and 6. Further, the wires of common cancellation loop 146 pass through the ferrite core of each stub receive transformer 92 so that the signals flowing in transmit-receive stub 140 and common cancellation loop 146 induce currents of opposite polarity, i.e., the signal supplied to each stub receive amplifier 99 is substantially equal to the difference between the signal current flowing along transmit-receive stub 140 and the signal current flowing along cancellation loop 146. To ensure optimum signal cancellation, the length of cancellation loop 146 that extends between each pair of serial interface units 144 should be approximately equal to the length of transmit-receive stub 140 that extends between the same two serial interface units. Resistors 110, which are included in serial interface module No. 1 and No. m in FIG. 9 and exhibit a resistance value substantially equal to the characteristic impedance of common cancellation loop 146, are interconnected between the ends of the twisted wire pair that forms common cancellation loop 146 to prevent signal reflection and establish a cancellation loop resistance that is equal to twice the characteristic impedance of transmit-receive stub 140.

Based on the circuit operation described relative to the arrangements of FIGS. 5 and 7, those skilled in the art will recognize that the arrangement of FIG. 9 operates in a manner that is identical to operation of an arrangement in which each of the utilization devices 10 that are coupled to transmit-receive stub 140 coupled to data bus 12 by separate stub couplers and interface units. That is, in the arrangement of FIG. 9, data signals generated by any of the utilization devices 10 that are coupled to transmit-receive stub 140 induce signals in transmit-receive stub 140 which are, in turn, coupled to data bus 12 via stub receive transformer 92 and transmit coupler transformer 28 of combined bus-stub coupler 142. When a data signal is induced in transmit-receive stub 140 by one of the utilization devices 10, a signal current of equal magnitude is induced in common cancellation loop 146 to thereby prevent direct signal communication between utilization devices 10 that are coupled to transmit-receive stub 140. However, since the transmitted data signal is induced in data bus 12, a signal representative of the data signal transmitted by one of the utilization devices 10 and any other data signals propagating along data bus 12 are coupled to transmit-receive stub 140 and made available to the receive circuits of each utilization device 10. Specifically, in a manner that is analogous to the previously described operation of arrangement of FIG. 5, all signals propagating along data bus 12 are coupled to transmit-receive stub 140 via bus receive transformer 36, bus receive amplifier 34, stub driver 97 and stub transmit transformer 90 of combined bus-stub coupler 142. These data signals then are coupled to the receive channel of each utilization device 10 that is coupled to transmit-receive stub 140 via stub receive transformer 92, stub receive amplifier 99 and interface unit 18 of the serial interface module 144 that is associated with the utilization device.

Coupling data signals to and from a data bus by means of the above-described arrangement of FIG. 9 reduces system complexity in situations in which a plurality of utilization devices are located in close proximity to one another since only one combined bus-stub coupler 142 (or bus coupler 16 of FIG. 5) need be provided. This aspect of the invention not only results in reduced cost and system weight, but can result in improved system performance. In this regard, because of manufacturing tolerances and other practical considerations, a certain amount of signal reflection occurs when signals are coupled to and from data bus 12. In prior art arrangements such as the system depicted in FIG. 2, coupling a plurality of closely located utilization devices to the data bus often results in clustering the bus couplers along a relatively short length of the data bus. In such a situation, the signal reflections, which are in effect noise signals, can build to a level that deleteriously affects system performance.

FIG. 9 also illustrates an additional aspect of the invention that relates to system topology. Specifically, shown in FIG. 9 is a serial interface module 144 (designated as serial interface No. n), which is directly coupled to data bus 12 without the use of the combined bus-stub coupler 142 or a transmit-receive stub. No cancellation loop is included in the directly coupled serial interface No. n. Since the circuit topology of serial interface No. n becomes identical to the topology of prior art bus coupler arrangement of FIG. 3. Thus, it can be noted that the inclusion of a stub coupler and interface unit in a single housing or module allows utilization devices 10 that are located directly along the path of data bus 12 be coupled to data bus 12 without the use of either a prior art communications link (e.g., transmit stub 24 and receive stub 32 of FIG. 2), or a transmit-receive stub of this invention (82 in FIGS. 5–7; 140 in FIG. 9).

It will be noted by those skilled in the art that a digital data communication system configured in accordance with the invention can include any desired mix of the coupling arrangements shown in FIGS. 5 and 9 to thereby efficiently and economically accommodate a wide range of system design situations. That is, for any given spatial arrangement of utilization devices 10, the routing of data bus 12 can be established in accordance with system design consideration such as space, accessibility and avoiding regions in which high levels of electromagnetic interference may exist. Based on the proximity of data bus 12 to the utilization devices 10 and the spatial relationship between the utilization devices, the various coupling arrangements of the invention can be established to provide the most advantageous system topology from the standpoint of cost, weight and signal considerations. Specifically: utilization devices 10 that are located along the path of data bus 12 can be directly coupled to the data bus in the manner described relative to the serial interface module No. n in FIG. 9; utilization devices 10 that are spaced apart from data bus 12 and are not located in close proximity to other utilization devices 10 can be coupled to data bus 12 using the transmit-receive stub 82 arrangement illustrated in and described relative to FIGS. 5–7; and groups or clusters of utilization devices 10 that are located near one another can be coupled to data bus 12 using the transmit-receive stub 140 arrangement described relative to FIG. 9.

Those skilled in the art also will recognize that various changes and modifications can be made to the disclosed embodiments of the invention without departing from the scope and spirit of the invention. For example, in some digital data communications systems interface units 18 may be incorporated in the associated utilization devices 10, or may not be required. Further, in some instances line driver 26 and stub receiver amplifier 99 (and/or bus receive amplifier 34 and stub driver 97) can be combined in a single circuit.

The embodiments of the invention in which an exclusive property or privilege is claimed are defined as follows:

1. In a digital data communications system of the type that includes a current mode data bus for providing data signal communication between a plurality of utilization devices, at least a portion of the utilization devices being individually coupled to the data bus by means of a bus coupler that includes a bus receive coupler for inductively coupling from the data bus data signals that are to be supplied to a utilization device that is associated with the bus coupler and a bus transmit coupler for inductively coupling to the data bus data signals that correspond to signals generated by the associated utilization device, the improvement comprising:

a current mode data stub for duplex data transmission both of said data signals coupled from said data bus by said bus receive coupler and said signals generated by said associated utilization device;

a first stub coupler connected in signal communication with an associated bus coupler and said current mode data stub, said first stub coupler including a stub transmit transformer connected for receiving signals supplied by said bus receive coupler and for inducing corresponding signals in said current mode data stub, said first stub coupler also including a stub receive transformer connected for receiving signals propagating along said current mode data stub and for supplying corresponding signals to said bus transmit coupler, said first stub coupler further including a signal cancellation circuit inductively coupled to both said stub transmit transformer and said stub receive transformer for eliminating from said signals supplied to said bus receive coupler signal components that correspondent to data signals induced in said current mode data stub by said stub transmit transformer of said first stub coupler; and a second stub coupler connected in signal communication with said current mode data stub and said associated utilization device, said second stub coupler including a stub transmit transformer connected for receiving signals corresponding to data signals supplied by said associated utilization device and for inducing corresponding signals in said current mode data stub, said second stub coupler also including a stub receive transformer connected for receiving signals propagating along said current mode data stub and for supplying corresponding signals to said associated utilization device, said second stub coupler further including a signal cancellation circuit inductively coupled to both said stub transmit transformer and said stub receive transformer for eliminating from said signals supplied to said utilization device signal components that correspond to data signals induced on said current mode data stub by said stub transmit transformer of said second stub coupler.

2. The improvement of claim 1, wherein each said current mode data stub is an unshielded twisted wire pair.

3. The improvement of claim 2, wherein said stub transmit transformer and said stub receive transformer of said first stub coupler and said stub transmit transformer and said stub receive transformer of said second stub coupler are installed to said current mode data stub in spaced apart relationship with one another, each said stub transmit transformer and said stub receive transformer including a core having wound thereon a primary winding and having at least a pair of apertures, each wire of said unshielded twisted wire pair that form said current mode data stub passing through an aperture of both said cores of said spaced apart stub transmit transformer and said stub receive transformer to inductively couple each said wire of said current mode data stub to each said primary winding; and wherein said cancellation circuits of said first and second stub couplers each include a conductor that passes through said aperture of said cores to form a current loop.

4. The improvement of claim 3, wherein said wires of said current mode data stub extend through said apertures of said cores without being twisted in the region that separates said cores from one another and wherein each said conductor that forms said current loop crosses over itself to form a single twist in said region that separates said cores from one another.

5. The improvement of claim 4, wherein each end of said unshielded twisted wire pair that forms said current mode data stub is terminated by an impedance that is substantially equal to the characteristic impedance of said unshielded twisted wire pair and wherein each said current loop that defines said cancellation loop includes series resistance that is substantially equal to twice said characteristic impedance of said current mode data stub.

6. The improvement of claim 5, wherein said first stub coupler includes active circuitry for amplifying data signals supplied to said stub transmit transformer and for amplifying data signals supplied by said stub receive transformer and said improvement further comprises circuit means for supplying operating current to said active circuitry through said wires of said unshielded twisted wire pair that forms said current mode data stub.

7. The improvement of claim 6, wherein said circuit means for supplying said operating current to said active circuitry of said first stub coupler includes a first stub termination module located at one end of said current mode data stub and a second stub termination module located at the second end of said current mode data stub, each said termination module including first and second inductors respectively connected to the ends of the two wires that form said current mode data stub and a resistor and capacitor connected in series between the terminals of said first and second inductors that are connected to said wires of said current mode data stub.

8. The improvement of claim 7, further comprising a plurality of toroidal ferrite cores encircling said unshielded twisted wire pair that forms said current mode data stub at spaced apart locations along said data stub.

9. The improvement of claim 7, further comprising a relatively lightweight elastomeric jacket installed to surround and magnetically shield said unshielded twisted wire pair that forms said current mode data stub.

10. The improvement of claim 1, including a plurality of said second stub couplers each of which are associated with a different one of said utilization devices, each of said plurality of said second stub couplers being connected to induce data signals in said current mode data stub that correspond to signals supplied by its associated utilization device and being connected to supply to its associated utilization device signals that correspond to data signals induced in said current mode data stub by said transmit transformer of said first stub coupler; and wherein said cancellation circuits of said plurality of said second stub couplers are interconnected to form a common cancellation circuit for eliminating from said signal supplied to each said utilization device signal components that are induced in said current mode data stub by said transmit transformers of said plurality of said second stub couplers.

11. The improvement of claim 10, wherein said current mode data stub is an unshielded twisted wire pair.

12. The improvement of claim 11, wherein said stub transmit transformer and said stub receive transformer of said first stub coupler and said stub transmit transformer and said stub receive transformer of each said second stub coupler are installed to said current mode data stub in spaced apart juxtaposition with one another, each said stub transmit transformer and said stub receive transformer including a core having wound thereon a primary winding and having at least a pair of apertures, each wire of said unshielded twisted wire pair that form said current mode data stub passing through an aperture of both said cores of said spaced apart stub transmit transformer and said stub receive transformer to inductively couple each said wire of said current mode data stub to each said primary winding; and wherein said cancellation circuits of said first and second stub couplers each include a conductor that passes through said aperture of said cores to form a current loop.

13. The improvement of claim 12, wherein said wires of said current mode data stub extend through said apertures of said cores without being twisted in the region that separates said cores from one another and wherein each said conductor that forms said current loop crosses over itself to form a single twist in said region that separates said cores from one another.

14. The improvement of claim 13, wherein each end of said unshielded twisted wire pair that forms said current mode data stub is terminated by an impedance that is substantially equal to the characteristic impedance of said unshielded twisted wire pair and wherein said common cancellation circuit of said plurality of second stub couplers is a current path that includes series resistance substantially equal to twice said characteristic impedance of said current mode data stub.

15. The improvement of claim 14, wherein said first stub coupler includes active circuitry for amplifying data signals supplied to said stub transmit transformer and for amplifying data signals supplied by said stub receive transformer and said improvement further comprises circuit means for supplying operating current to said active circuitry through said wires of said unshielded twisted wire pair that forms said current mode data stub.

16. The improvement of claim 15, wherein said circuit means for supplying said operating current to said active circuitry of said first stub coupler includes a first termination module located at one end of said current mode data stub and a second stub termination module located at the second end of said current mode data stub, each said termination module including first and second inductors respectively connected to the ends of the two wires that form said current mode data stub and a resistor and capacitor connected in series between the terminals of said first and second inductors that are connected to said wires of said current mode data stub.

17. The improvement of claim 16, further comprising a plurality of toroidal ferrite cores encircling said unshielded twisted wire pair that forms said current mode data stub at spaced apart locations along said data stub.

18. The improvement of claim 16, further comprising a relatively lightweight elastomeric jacket installed to surround and magnetically shield said unshielded twisted wire pair that forms said current mode data stub.

19. A current mode data communications system comprising:

an unshielded twisted wire pair, each end of said twisted pair being terminated to form a current mode data bus for substantially reflectionless transmission of data signals;

at least two data bus couplers, each said data bus coupler including a bus transmit transformer for inducing data signals in said current mode data bus and a bus receive transformer for coupling data signals from said current mode data bus;

at least two current mode data stubs each formed by a length of unshielded twisted wire pair, each said current mode data stub being associated with and in signal communication with a different one of said bus couplers;

at least two bus-to-stub couplers, each said bus-to-stub coupler being associated with a different one of said bus couplers and a different one of said current mode data stubs to establish signal communication between the associated bus coupler and the associated current mode data stub, each said bus-to-stub coupler including a stub transmit transformer and a stub receive transformer, said stub transmit transformer being connected for receiving signals coupled from said data bus by said bus coupler receive transformer and for inducing corresponding signals in said associated current mode data stub, said stub receive transformer being connected for coupling signals from said associated current mode data stub and for supplying signals to said associated bus coupler transmit transformer, each said bus-to-stub coupler further including a cancellation loop interconnected with said stub receive transformer and said stub transmit transformer to substantially eliminate from said signal supplied to said bus coupler transmit transformer said signals induced in said current mode data stub by said stub transmit transformer;

a plurality of utilization devices, at least one of said utilization devices being connected in signal communication with each of said current mode data stubs for receiving signals coupled from said current mode data bus and for supplying signals to be induced in said current mode data bus; and at least two interface-to-stub couplers, each said interface-to-stub couplers being associated with one of said current mode data stubs to establish signal communication between the associated current mode data stub and one of said utilization devices, each said stub-to-interface couplers including a stub transmit transformer and a stub receive transformer, said stub transmit transformer being connected for receiving signals supplied to said bus-to-interface coupler by the utilization device associated with said bus-to-interface coupler and for inducing corresponding signals in said current mode data stub, said stub receive transformer being connected for coupling signals from said current mode data stub and for supplying signals to said associated utilization device, each said stub-to-interface coupler further including a cancellation loop interconnected with said stub receive transformer and said stub transmit transformer to substantially eliminate from said signals supplied to said associated utilization device said signals induced in said current mode data stub by said stub transmit transformer.

20. The current mode data communications system of claim 19, wherein said stub transmit transformer and said stub receive transformer of said bus-to-stub couplers and said stub-to-interface couplers each include a core having wound thereon a primary winding and having at least two spaced apart apertures, each said aperture for passage of one of the conductors of said current mode data stub to inductively couple said conductor to said primary coil of that particular transformer, said stub transmit transformer and said stub receive transformer of each particular bus-to-stub coupler and each stub-to-interface coupler being mounted in spaced apart relationship with one another along the current mode data stub associated with that particular bus-to-stub coupler and stub-to-interface coupler with each conductor of said associated current mode data stub passing through a separate aperture of said cores of said transmit and stub receive transformers without being twisted in the region that separates said cores from one another; and wherein said cancellation loop of each said bus-to-stub coupler and each stub-to-interface coupler includes an electrical conductor that passes through said apertures of said spaced apart cores of said stub transmit transformer and said stub receive transformer with said electrical conductor being twisted in said region between said spaced apart cores.

21. The current mode data communication system of claim 20, wherein each end of each unshielded twisted wire pair that forms one of said current mode data stubs is terminated with an impedance that is substantially equal to the characteristic impedance of said current mode data stub; and wherein each said electrical conductor of said cancellation loops includes series impedance substantially equal to twice the characteristic impedance of said associated current mode data stub.

22. The current mode data communication system of claim 19, wherein a plurality of said utilization devices are associated with at least one of said current mode data stubs; and wherein said cancellation loops of the stub-to-interface couplers that provides signal communication between said plurality of said utilization devices and said current mode data stub are interconnected with one another to form a single current path.

* * * * *